US012548501B2

(12) United States Patent

Shin et al.

(10) Patent No.: US 12,548,501 B2
(45) Date of Patent: Feb. 10, 2026

(54) DISPLAY DEVICE

(71) Applicant: Samsung Display Co., LTD., Yongin-si (KR)

(72) Inventors: Dong Hee Shin, Yongin-si (KR); Sun Kwun Son, Yongin-si (KR); Na Hyeon Cha, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 19/022,342

(22) Filed: Jan. 15, 2025

(65) Prior Publication Data

US 2025/0322785 A1 Oct. 16, 2025

(30) Foreign Application Priority Data

Apr. 11, 2024 (KR) ........................ 10-2024-0048680

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2300/0426* (2013.01); *G09G 2300/0819* (2013.01); *G09G 2300/0852* (2013.01); *G09G 2310/08* (2013.01)

(58) Field of Classification Search
CPC ................... G09G 3/32; G09G 3/2007; G09G 2300/0426; G09G 2300/0819; G09G 2300/0852; G09G 2310/08
See application file for complete search history.

(56) References Cited

U.S. PATENT DOCUMENTS

| | | | | |
|---|---|---|---|---|
| 11,373,586 | B2 | 6/2022 | Jeong et al. | |
| 2005/0156832 | A1* | 7/2005 | Ono | G09G 3/3258 345/76 |
| 2018/0217834 | A1* | 8/2018 | Park | G06F 8/654 |
| 2021/0065642 | A1* | 3/2021 | Shin | G02F 1/136286 |
| 2023/0238398 | A1* | 7/2023 | Choi | H10D 86/60 |

FOREIGN PATENT DOCUMENTS

| | | |
|---|---|---|
| KR | 10-0493439 | 6/2005 |
| KR | 10-2007-0087844 | 8/2007 |
| KR | 10-2017-0123958 | 11/2017 |
| KR | 10-2020-0050282 | 5/2020 |
| KR | 10-2022-0146220 | 11/2022 |
| KR | 10-2023-0053780 | 4/2023 |

* cited by examiner

*Primary Examiner* — Andrew Sasinowski
(74) *Attorney, Agent, or Firm* — CANTOR COLBURN LLP

(57) ABSTRACT

A display device includes a data line, and first, second, and third pixels electrically connected to the data line. Each of the first, second, and third pixels includes a light emitting element, a first transistor that controls a control current, a second transistor that electrically connects the data line to a second node, which is a first electrode of the first transistor, a third transistor that electrically connects the first node to a third node, which is a second electrode of the first transistor, a fourth transistor that controls a driving current, which is supplied to the light emitting element, and a fifth transistor that electrically connects the data line to a fifth node, which is a first electrode of the fourth transistor. The data line is electrically connected to the fifth transistor of each of the first and second pixels through a connection electrode.

21 Claims, 19 Drawing Sheets

ACTL1:DE1,ACT1,SE1
GTL1:GE1,C1a
GTL2:C1b,BML1
ACTL2:DE2,ACT2,SE2,C1c
GTL3:GE2
SDL1:CE9,CE12
SDL2:DL

DISPLAY DEVICE

CROSS-REFERENCE TO RELATED APPLICATION(S)

This application claims priority to and benefits of Korean Patent Application No. 10-2024-0048680 under 35 U.S.C. § 119, filed on Apr. 11, 2024, in the Korean Intellectual Property Office (KIPO), the entire contents of which are incorporated herein by reference.

BACKGROUND

1. Technical Field

Embodiments relate to a display device.

2. Description of the Related Art

As the information society develops, demands for display devices for displaying images are increasing in various forms. The display devices may be flat panel display devices such as liquid crystal display devices, field emission display devices, and organic light emitting display devices.

Light emitting display devices may include organic light emitting display devices including organic light emitting diodes or inorganic light emitting display devices including inorganic light emitting diodes. An organic light emitting display device may adjust the luminance or grayscale level of light emitted from an organic light emitting diode by adjusting the magnitude of a driving current applied to the organic light emitting diode. The wavelength of light emitted from an inorganic light emitting diode varies according to the driving current. Therefore, image quality may deteriorate if the inorganic light emitting diode is driven in the same manner as the organic light emitting diode.

SUMMARY

Embodiments provide a display device with high-resolution image quality by increasing the integration density of a pixel circuit by reducing the number of contact holes and signal lines.

However, embodiments are not limited to those set forth herein. The above and other embodiments will be apparent to one of ordinary skill in the art to which the disclosure pertains by referencing the detailed description of the disclosure given below.

According to an embodiment, a display device includes a data line extending in a first direction, and a first pixel, a second pixel, and a third pixel sequentially disposed in the first direction and electrically connected to the data line. Each of the first, second, and third pixels includes a light emitting element, a first transistor that controls a control current based on a voltage of a first node, a second transistor that electrically connects the data line to a second node, which is a first electrode of the first transistor based on a first scan write signal, a third transistor that electrically connects the first node to a third node, which is a second electrode of the first transistor based on the first scan write signal, a fourth transistor that controls a driving current, which is supplied to the light emitting element, based on a voltage of a fourth node receiving the control current, a fifth transistor that electrically connects the data line to a fifth node, which is a first electrode of the fourth transistor based on a second scan write signal, and a sixth transistor that electrically connects the fourth node to a sixth node, which is a second electrode of the fourth transistor based on the second scan write signal. The data line is electrically connected to the fifth transistor of each of the first and second pixels through one connection electrode.

The connection electrode may overlap a boundary area of the first and second pixels.

The data line may include a plurality of first portions electrically connected to the second transistors of the first and second pixels, respectively, and a second portion simultaneously connected to the fifth transistors of the first and second pixels.

One of the first portions of the data line may supply a first data voltage having a grayscale value of the first pixel in case that the second and third transistors of the first pixel are turned on, another one of the first portions of the data line may supply a first data voltage having a grayscale value of the second pixel in case that the second and third transistors of the second pixel are turned on, and the second portion of the data line may supply a second data voltage, which is a constant voltage, in case that the fifth and sixth transistors of the first and second pixels are turned on.

The display device may further include a sweep line supplying a sweep signal having a pulse that linearly decreases from a gate-high voltage to a gate-low voltage, and a first capacitor comprising a first capacitor electrode connected to the first node and a second capacitor electrode connected to the sweep line.

The first and fourth transistors may include a low-temperature polysilicon-based semiconductor layer, and the second, third, fifth and sixth transistors may include an oxide-based semiconductor layer.

The display device may further include an emission line extending in a second direction intersecting the first direction. Each of the first, second, and third pixels may further include a seventh transistor that supplies a first high-potential voltage to the second node based on an emission signal of the emission line, and an eighth transistor that electrically connects the fourth node to the third node and based on the emission signal.

The seventh transistor of the second pixel and the seventh transistor of the third pixel may be electrically connected to an emission line.

The emission line may overlap a boundary area of the second and third pixels.

Each of the first, second, and third pixels may further include a ninth transistor that supplies a second high-potential voltage to the fifth node based on the emission signal, and a tenth transistor that electrically connects the sixth node to a seventh node, which is a first electrode of the light emitting element, based on the emission signal.

Each of the first, second, and third pixels may further include an eleventh transistor that discharges the first node to an initialization voltage based on a first scan initialization signal, and a twelfth transistor that discharges the fourth node to the initialization voltage based on a second scan initialization signal.

The display device may further include a first low-potential line that supplies a first low-potential voltage to a second electrode of the light emitting element. Each of the first, second, and third pixels may further include a thirteenth transistor discharging the seventh node to a second low-potential voltage based on the voltage of the fourth node.

According to an embodiment, a display device includes a data line extending in a first direction, an emission line extending in a second direction intersecting the first direction, and a first pixel, a second pixel, and a third pixel sequentially disposed in the first direction and electrically connected to the data line. Each of the first, second, and third pixels includes a light emitting element, a first transistor that controls a control current based on a voltage of a first node, a second transistor that is turned on during a first period to electrically connect a second node, which is a first electrode of the first transistor, and the data line, a third transistor turned on during the first period to electrically connect the first node to a third node, which is a second electrode of the first transistor, a fourth transistor that supplies a first high-potential voltage to the second node based on an emission signal of the emission line, and a fifth transistor that electrically connects a fourth node to the third node based on the emission signal. The fourth transistor of the second pixel and the fourth transistor of the third pixel are electrically connected to an emission line.

The emission line may overlap a boundary area of the second and third pixels.

The emission line may include an extending portion extending in the second direction, a first protruding portion protruding from the extending portion toward a first side and overlapping the second pixel, and a second protruding portion protruding from the extending portion toward a second side opposite to the first side and overlapping the third pixel.

The first protruding portion of the emission line may include a gate electrode of the fourth transistor of the second pixel, and the second protruding portion comprises a gate electrode of the fourth transistor of the third pixel.

Each of the first, second, and third pixels may further include a sixth transistor that discharges the first node to an initialization voltage during a second period before the first period, a seventh transistor that controls a driving current, which is supplied to the light emitting element, based on a voltage of the fourth node receiving the control current, an eighth transistor that is turned on during a third period after the first period to electrically connect the data line to a fifth node, which is a first electrode of the seventh transistor, and a ninth transistor that is turned on during the third period to electrically connect the fourth node to a sixth node, which is a second electrode of the seventh transistor.

The data line may supply a first data voltage having a grayscale value during the first period and may supply a second data voltage, which is a constant voltage, during the third period.

The display device may further include a sweep line that supplies a sweep signal, which linearly decreases from a gate-high voltage to a gate-low voltage, during a fourth period after the third period. Each of the first, second, and third pixels may further include a first capacitor including a first capacitor electrode connected to the first node and a second capacitor electrode connected to the sweep line.

Each of the first, second, and third pixels may further include a tenth transistor that supplies a second high-potential voltage to the fifth node during the fourth period, and an eleventh transistor that electrically connects the sixth node to a seventh node, which is a first electrode of the light emitting element, during the fourth period.

According to an embodiment, an electronic device includes a display module configured to provide an image, and a processor configured to transmit an image data signal to the display module. The display module includes a data line extending in a first direction, and a first pixel, a second pixel, and a third pixel sequentially disposed in the first direction and electrically connected to the data line. Each of the first, second, and third pixels includes a light emitting element, a first transistor that controls a control current based on a voltage of a first node, a second transistor that electrically connects the data line to a second node, which is a first electrode of the first transistor based on a first scan write signal, a third transistor that electrically connects the first node to a third node, which is a second electrode of the first transistor based on the first scan write signal, a fourth transistor that controls a driving current, which is supplied to the light emitting element, based on a voltage of a fourth node receiving the control current, a fifth transistor that electrically connects the data line to a fifth node, which is a first electrode of the fourth transistor based on a second scan write signal, and a sixth transistor that electrically connects the fourth node to a sixth node, which is a second electrode of the fourth transistor based on the second scan write signal. The data line is electrically connected to the fifth transistor of each of the first and second pixels through one connection electrode.

According to an embodiment, a data line may supply a data voltage to each of a plurality of pixels through a connection electrode to reduce the number of contact holes, and an emission signal may be supplied to each of the pixels through an emission line. Therefore, the integration density of pixel circuits may be increased, and high-resolution image quality may be realized.

BRIEF DESCRIPTION OF THE DRAWINGS

The accompanying drawings, which are included to provide a further understanding of the disclosure, illustrate embodiments in which.

DETAILED DESCRIPTION OF THE EMBODIMENTS

Figure 1:
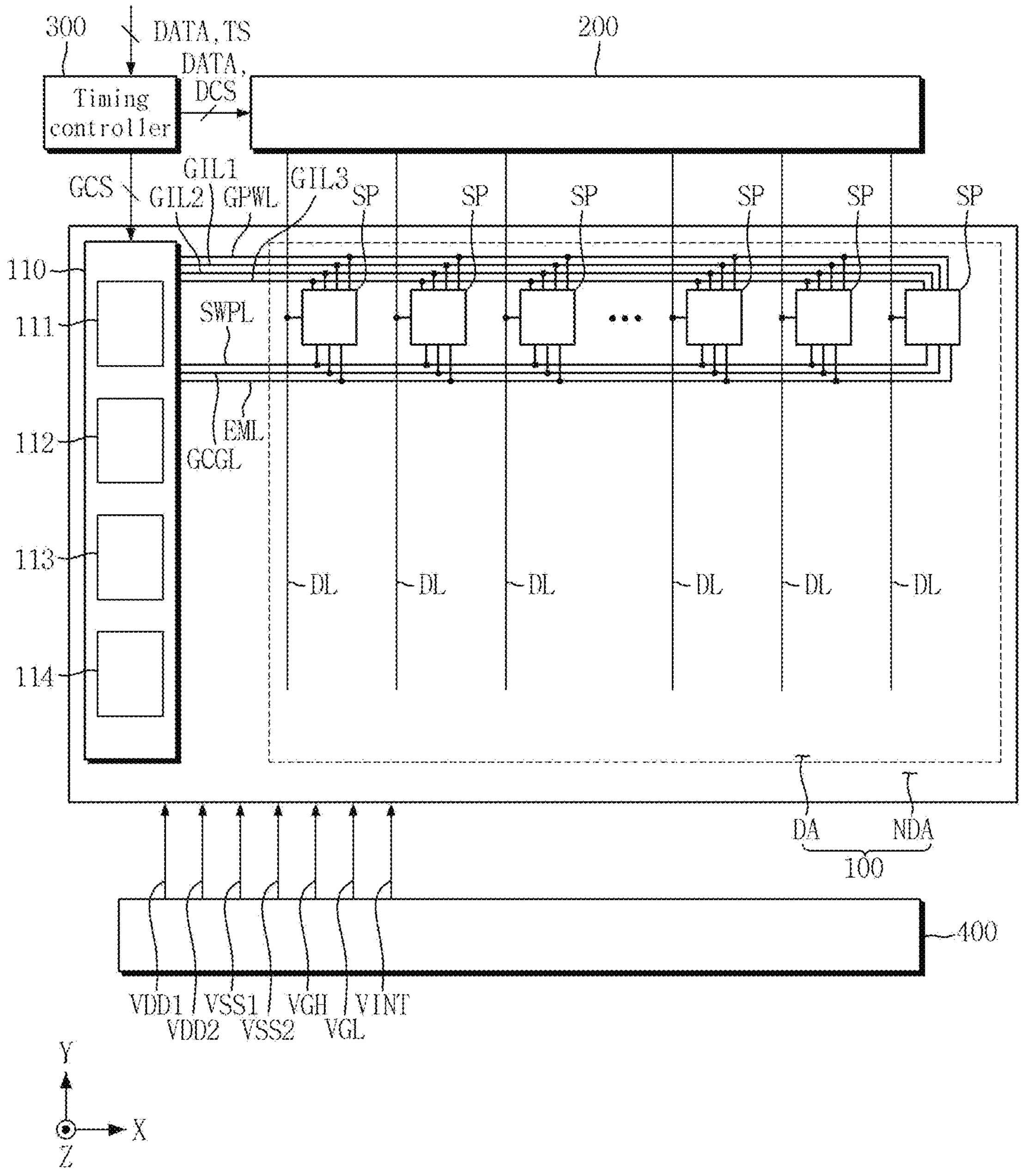
FIG. 1 is a schematic block diagram of a display device according to an embodiment.

The embodiments will now be described more fully hereinafter with reference to the accompanying drawings. The embodiments may, however, be provided in different forms and should not be construed as limiting. The same reference numbers indicate the same components throughout the disclosure. In the accompanying figures, the thickness of layers and regions may be exaggerated for clarity.

Some of the parts which are not associated with the description may not be provided in order to describe embodiments of the disclosure.

It will also be understood that in case that a layer is referred to as being "on" another layer or substrate, it may be directly on another layer or substrate, or intervening layers may also be present. In contrast, in case that an element is referred to as being "directly on" another element, there may be no intervening elements present.

Further, the phrase "in a plan view" means in case that an object portion is viewed from above, and the phrase "in a schematic cross-sectional view" means in case that a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

In case that an element is referred to as being "connected" or "coupled" to another element, the element may be "directly connected" or "directly coupled" to another element, or "electrically connected" or "electrically coupled" to another element with one or more intervening elements interposed therebetween. It will be further understood that in case that the terms "comprises," "comprising," "has," "have," "having," "includes" and/or "including" are used, they may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, in case that "a first element" is discussed in the description, it may be termed "a second element" or "a third element," and "a second element" and "a third element" may be termed in a similar manner without departing from the teachings herein.

The terms "about" or "approximately" as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, "about" may mean within one or more standard deviations, or within about ±30%, 20%, 10%, 5% of the stated value.

In the description, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the description, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the description.

FIG. 1 is a schematic block diagram of a display device according to an embodiment.

Referring to FIG. 1, the display device may include a display panel 100, a gate driver 110, a data driver 200, a timing controller 300, and a power supply unit 400.

A display area DA of the display panel 100 may include pixels SP displaying an image and first scan initialization lines GIL1, second scan initialization lines GIL2, third scan initialization lines GIL3, first scan write lines GPWL, second scan write lines GCGL, emission lines EML, sweep lines SWPL and data lines DL connected to the pixels SP.

The first scan initialization lines GIL1, the second scan initialization lines GIL2, the third scan initialization lines GIL3, the first scan write lines GPWL, the second scan write lines GCGL, the emission lines EML, and the sweep lines SWPL may extend in an X-axis direction and may be spaced apart from each other in a Y-axis direction intersecting the X-axis direction. The data lines DL may extend in the Y-axis direction and may be spaced apart from each other in the X-axis direction.

Each of the pixels SP may include a light emitting element to emit light. The light emitting element may be an inorganic light emitting element including a first electrode, a second electrode, and an inorganic semiconductor disposed between the first electrode and the second electrode. For example, the light emitting element may be a micro light emitting diode including an inorganic semiconductor, but embodiments are not limited thereto.

A non-display area NDA of the display panel 100 may include the gate driver 110 which supplies signals to the first scan initialization lines GIL1, the second scan initialization lines GIL2, the third scan initialization lines GIL3, the first scan write lines GPWL, the second scan write lines GCGL, the emission lines EML, and the sweep lines SWPL. For example, the gate driver 110 may be disposed on an edge portion of the non-display area NDA or on edge portions (e.g., opposite edge portions) of the non-display area NDA. For another example, the gate driver 110 may be disposed in the display area DA.

The gate driver 110 may receive a gate control signal GCS from the timing controller 300. The gate control signal GCS may include an initialization control signal, a write control signal, a sweep control signal, and an emission control signal.

The gate driver 110 may include an initialization signal output unit 111, a write signal output unit 112, a sweep signal output unit 113, and an emission signal output unit 114.

The initialization signal output unit 111 may receive the initialization control signal from the timing controller 300. The initialization signal output unit 111 may supply a first scan initialization signal to the first scan initialization lines GIL1, supply a second scan initialization signal to the second scan initialization lines GIL2, and supply a third scan initialization signal to the third scan initialization lines GIL3 based on the initialization control signal.

The write signal output unit 112 may receive the write control signal from the timing controller 300. The write signal output unit 112 may supply a first scan write signal to the first scan write lines GPWL and supply a second scan write signal to the second scan write lines GCGL based on the write control signal.

The sweep signal output unit 113 may receive the sweep control signal from the timing controller 300. The sweep signal output unit 113 may supply sweep signals to the sweep lines SWPL based on the sweep control signal.

The emission signal output unit 114 may receive the emission control signal from the timing controller 300. The emission signal output unit 114 may supply emission signals to the emission lines EML based on the emission control signal.

The data driver 200 may receive digital video data DATA and a data control signal DCS from the timing controller 300. The data driver 200 may convert the digital video data DATA into analog data voltages and supply the analog data voltages to the data lines DL. Pixels SP may be selected by the first and second scan write signals of the gate driver 110, and the selected pixels SP may receive first and second data voltages.

The timing controller 300 may receive the digital video data DATA and a timing signal TS. The timing controller 300 may control the operation timing of the gate driver 110 by generating the gate control signal GCS based on the timing signal TS. The timing controller 300 may control the operation timing of the data driver 200 by generating the data control signal DCS based on the timing signal TS. The timing controller 300 may supply the digital video data DATA to the data driver 200.

The power supply unit 400 may generate power supply voltages and supply the power supply voltages to the display panel 100. The power supply unit 400 may supply a first high-potential voltage VDD1, a second high-potential voltage VDD2, a first low-potential voltage VSS1, a second low-potential voltage VSS2, a gate-high voltage VGH, a gate-low voltage VGL, and an initialization voltage VINT to the display panel 100. The first and second high-potential voltages VDD1 and VDD2 may be high-potential voltages for driving the light emitting elements of the pixels SP. The first and second low-potential voltages VSS1 and VSS2 may be low-potential voltages for driving the light emitting elements of the pixels SP. The initialization voltage VINT may be applied to the pixels SP, and the gate-high voltage VGH and the gate-low voltage VGL may be applied to the gate driver 110.

Figure 2:
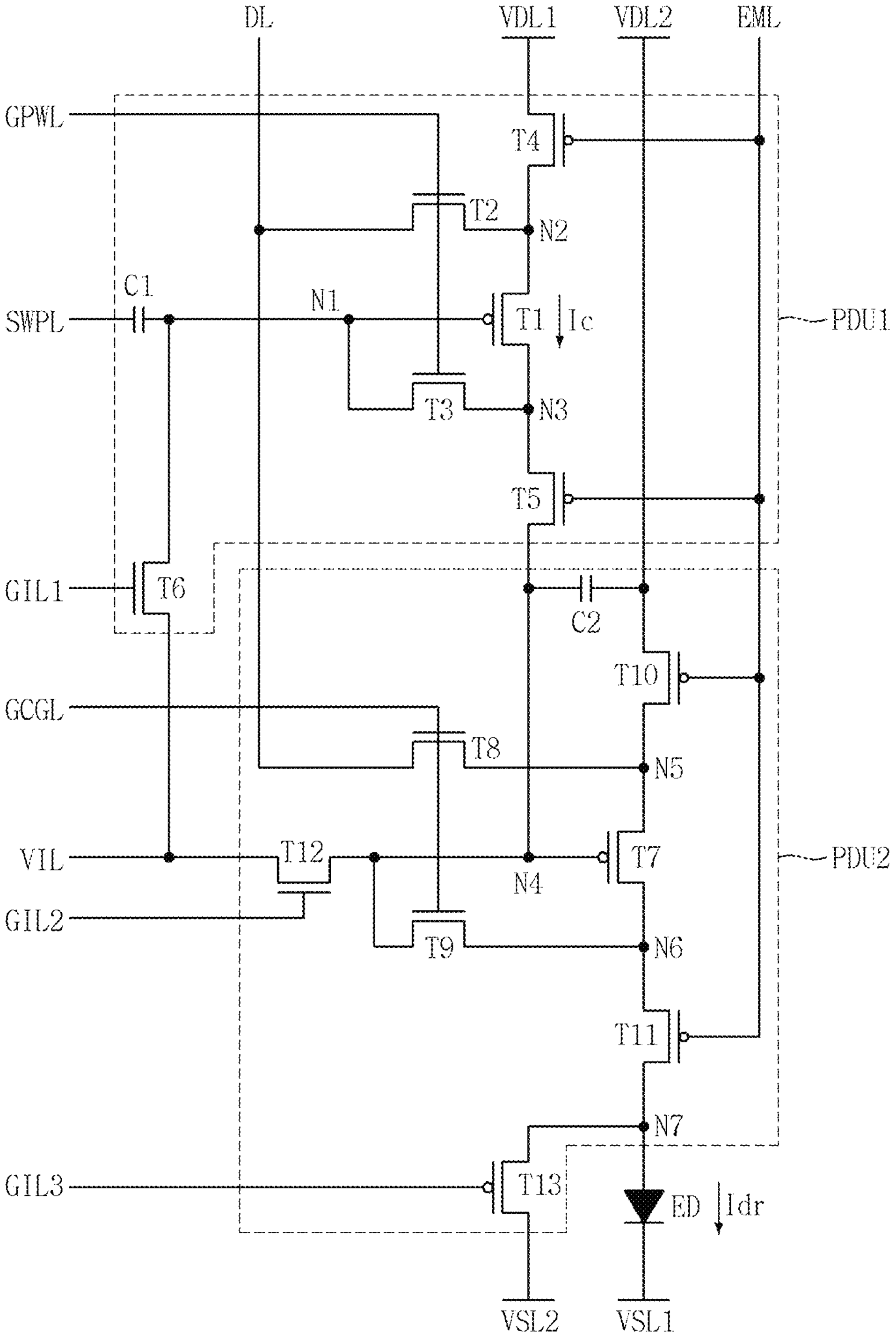
FIG. 2 is a schematic diagram of an equivalent circuit of a pixel according to an embodiment.

FIG. 2 is a schematic diagram of an equivalent circuit of a pixel SP according to an embodiment.

Referring to FIG. 2, the pixel SP may be connected to a first scan initialization line GIL1, a second scan initialization line GIL2, a third scan initialization line GIL3, a first scan write line GPWL, a second scan write line GCGL, an emission line EML, a sweep line SWPL, and a data line DL. For example, a first scan write signal of the first scan write line GPWL may be a scan signal for pulse width modulation, and a second scan write signal of the second scan write line GCGL may be a scan write signal for constant current generation. A first data voltage of the data line DL may be a data voltage for pulse width modulation, and a second data voltage of the data line DL may be a data voltage for constant current generation.

The pixel SP may be connected to a first high-potential line VDL1 supplying the first high-potential voltage VDD1, a second high-potential line VDL2 supplying the second high-potential voltage VDD2, a first low-potential line VSL1 supplying the first low-potential voltage VSS1, a second low-potential line VSL2 supplying the second low-potential voltage VSS2, and an initialization voltage line VIL supplying the initialization voltage VINT.

The pixel SP may include a first pixel driver PDU1, a second pixel driver PDU2, and a light emitting element ED.

The light emitting element ED may receive a driving current Idr generated by the second pixel driver PDU2 and emit light in response to the driving current Idr. The light emitting element ED may be connected between a seventh node N7 and the first low-potential line VSL1. A first electrode of the light emitting element ED may be electrically connected to a second electrode of an eleventh transistor T11 and a first electrode of a thirteenth transistor T13 through the seventh node N7. A second electrode of the light emitting element ED may be electrically connected to the first low-potential line VSL1 to receive the first low-potential voltage VSS1. The first electrode of the light emitting element ED may be an anode, and the second electrode of the light emitting element ED may be a cathode. The light emitting element ED may be an inorganic light emitting element including a first electrode, a second electrode, and an inorganic semiconductor disposed between the first electrode and the second electrode. For example, the light emitting element ED may be a micro light emitting diode made of an inorganic semiconductor, but embodiments are not limited thereto.

The first pixel driver PDU1 may control a voltage of a fourth node N4 of the second pixel driver PDU2 by generating a control current Ic based on the first data voltage of the data line DL. The control current Ic of the first pixel driver PDU1 may adjust a pulse width of a voltage applied to the first electrode of the light emitting element ED. The first pixel driver PDU1 may perform pulse width modulation of the voltage applied to the first electrode of the light emitting element ED. Therefore, the first pixel driver PDU1 may be a pulse width modulation unit.

The first pixel driver PDU1 may include first through sixth transistors T1 through T6 and a first capacitor C1.

The first transistor T1 may control the control current Ic flowing between a first electrode and a second electrode based on the first data voltage applied to a first node N1 which is a gate electrode.

The second transistor T2 may be turned on based on the first scan write signal of the first scan write line GPWL to supply the first data voltage of the data line DL to a second node N2 which is the first electrode of the first transistor T1. The second transistor T2 may have a gate electrode connected to the first scan write line GPWL, a first electrode connected to the data line DL, and a second electrode connected to the second node N2.

The third transistor T3 may be turned on based on the first scan write signal of the first scan write line GPWL to electrically connect a third node N3, which is the second electrode of the first transistor T1, and the first node N1. The third transistor T3 may have a gate electrode connected to the first scan write line GPWL, a first electrode connected to the third node N3, and a second electrode connected to the first node N1.

The fourth transistor T4 may be turned on based on an emission signal of the emission line EML to supply the first high-potential voltage VDD1 to the second node N2. The fourth transistor T4 may have a gate electrode connected to the emission line EML, a first electrode connected to the first high-potential line VDL1, and a second electrode connected to the second node N2.

The fifth transistor T5 may be turned on based on the emission signal of the emission line EML to electrically connect the third node N3 to the fourth node N4 of the second pixel driver PDU2. The fifth transistor T5 may have a gate electrode connected to the emission line EML, a first electrode connected to the third node N3, and a second electrode connected to the fourth node N4. Therefore, the fifth transistor T5 may supply the control current Ic to the fourth node N4 which is a gate electrode of a seventh transistor T7, and the seventh transistor T7 may be turned on based on the voltage of the fourth node N4, thereby adjusting the pulse width of the voltage applied to the first electrode of the light emitting element ED.

The sixth transistor T6 may be turned on based on a first scan initialization signal of the first scan initialization line GIL1 to electrically connect the first node N1 and the initialization voltage line VIL. The sixth transistor T6 may have a gate electrode connected to the first scan initialization line GIL1, a first electrode connected to the first node N1, and a second electrode connected to the initialization voltage line VIL.

The first capacitor C1 may be connected between the first node N1 and the sweep line SWPL. A first capacitor electrode of the first capacitor C1 may be connected to the first node N1, and a second capacitor electrode of the first capacitor C1 may be connected to the sweep line SWPL. The first capacitor C1 may maintain a potential difference between the first node N1 and the sweep line SWPL.

The second pixel driver PDU2 may generate the driving current Idr, which is supplied to the light emitting element ED, based on the second data voltage of the data line DL. The second pixel driver PDU2 may receive the second data voltage which is a constant voltage regardless of the luminance of the pixel SP and generate a constant current which is supplied to the light emitting element ED. Therefore, the second pixel driver PDU2 may be a constant current generation unit.

The second pixel driver PDU2 may include seventh through thirteenth transistors T7 through T13 and a second capacitor C2.

The seventh transistor T7 may control the driving current Idr flowing between a first electrode and a second electrode based on the second data voltage applied to the fourth node N4 which is the gate electrode. The seventh transistor T7 may control a period during which the driving current Idr flows through the light emitting element ED.

The eighth transistor T8 may be turned on based on the second scan write signal of the second scan write line GCGL to supply the second data voltage of the data line DL to a fifth node N5 which is the first electrode of the seventh transistor T7. The eighth transistor T8 may have a gate electrode connected to the second scan write line GCGL, a first electrode connected to the data line DL, and a second electrode connected to the fifth node N5.

The ninth transistor T9 may be turned on based on the second scan write signal of the second scan write line GCGL to electrically connect a sixth node N6, which is the second electrode of the seventh transistor T7, and the fourth node N4. The ninth transistor T9 may have a gate electrode connected to the second scan write line GCGL, a first electrode connected to the sixth node N6, and a second electrode connected to the fourth node N4.

The tenth transistor T10 may be turned on based on the emission signal of the emission line EML to supply the second high-potential voltage VDD2 to the fifth node N5. The tenth transistor T10 may have a gate electrode connected to the emission line EML, a first electrode connected to the second high-potential line VDL2, and a second electrode connected to the fifth node N5.

The eleventh transistor T11 may be turned on based on the emission signal of the emission line EML to electrically connect the sixth node N6 to the seventh node N7 which is the first electrode of the light emitting element ED. The eleventh transistor T11 may have a gate electrode connected to the emission line EML, a first electrode connected to the sixth node N6, and the second electrode connected to the seventh node N7.

The twelfth transistor T12 may be turned on based on the second scan initialization signal of the second scan initialization line GIL2 to electrically connect the fourth node N4 and the initialization voltage line VIL. The twelfth transistor T12 may have a gate electrode connected to the second scan initialization line GIL2, a first electrode connected to the fourth node N4, and a second electrode connected to the initialization voltage line VIL.

The thirteenth transistor T13 may be turned on based on a third scan initialization signal of the third scan initialization line GIL3 to discharge the seventh node N7 to the second low-potential voltage VSS2. The thirteenth transistor T13 may have a gate electrode connected to the third scan initialization line GIL3, the first electrode connected to the seventh node N7, and a second electrode connected to the second low-potential line VSL2.

The second capacitor C2 may be connected between the fourth node N4 and the second high-potential line VDL2. A first capacitor electrode of the second capacitor C2 may be connected to the fourth node N4, and a second capacitor electrode of the second capacitor C2 may be connected to the second high-potential line VDL2. The second capacitor C2 may maintain a potential difference between the fourth node N4 and the second high-potential line VDL2.

The second, third, sixth, eighth, ninth, and twelfth transistors T2, T3, T6, T8, T9, and T12 may include an oxide-based semiconductor layer. The second, third, sixth, eighth, ninth, and twelfth transistors T2, T3, T6, T8, T9, and T12 may be implemented as N-type metal-oxide-semiconductor field effect transistors (MOSFETs) and may be turned on based on a gate voltage of a gate-high level. The second, third, sixth, eighth, ninth, and twelfth transistors T2, T3, T6, T8, T9, and T12 may have a coplanar structure in which a gate electrode is disposed on an oxide-based semiconductor layer, but embodiments are not limited thereto. The second, third, sixth, eighth, ninth, and twelfth transistors T2, T3, T6, T8, T9, and T12 including an oxide-based semiconductor layer may have a smaller S-factor than transistors including a polysilicon-based semiconductor layer. The second, third, sixth, eighth, ninth, and twelfth transistors T2, T3, T6, T8, T9, and T12 may be kept turned off at a peak black grayscale level and may have excellent off-current characteristics, thereby improving the expression of the peak black grayscale level. Therefore, the second, third, sixth, eighth, ninth, and twelfth transistors T2, T3, T6, T8, T9, and T12 may prevent leakage current from being supplied to the light emitting element ED and may stably maintain a voltage inside a pixel circuit.

The first, fourth, fifth, seventh, tenth, eleventh, and thirteenth transistors T1, T4, T5, T7, T10, T11, and T13 may include a polysilicon or amorphous silicon-based semiconductor layer. The first, fourth, fifth, seventh, tenth, eleventh, and thirteenth transistors T1, T4, T5, T7, T10, T11, and T13 may be implemented as P-type MOSFETs and may be turned on based on a gate voltage of a gate-low level. In case that the semiconductor layers of the first, fourth, fifth, seventh, tenth, eleventh, and thirteenth transistors T1, T4, T5, T7, T10, T11, and T13 include polysilicon, they may be formed through a low-temperature polysilicon (LTPS) process. The first, fourth, fifth, seventh, tenth, eleventh, and thirteenth transistors T1, T4, T5, T7, T10, T11, and T13 including an LPTS-based semiconductor layer may have high electron mobility and excellent turn-on characteristics.

Embodiments are not limited to the illustration in FIG. 2. At least one of the second, third, sixth, eighth, ninth and twelfth transistors T2, T3, T6, T8, T9 and T12 may include a silicon-based semiconductor layer, and at least one of the first, fourth, fifth, seventh, tenth, eleventh and thirteenth transistors T1, T4, T5, T7, T10, T11 and T13 may include an oxide-based semiconductor layer.

Figure 3:
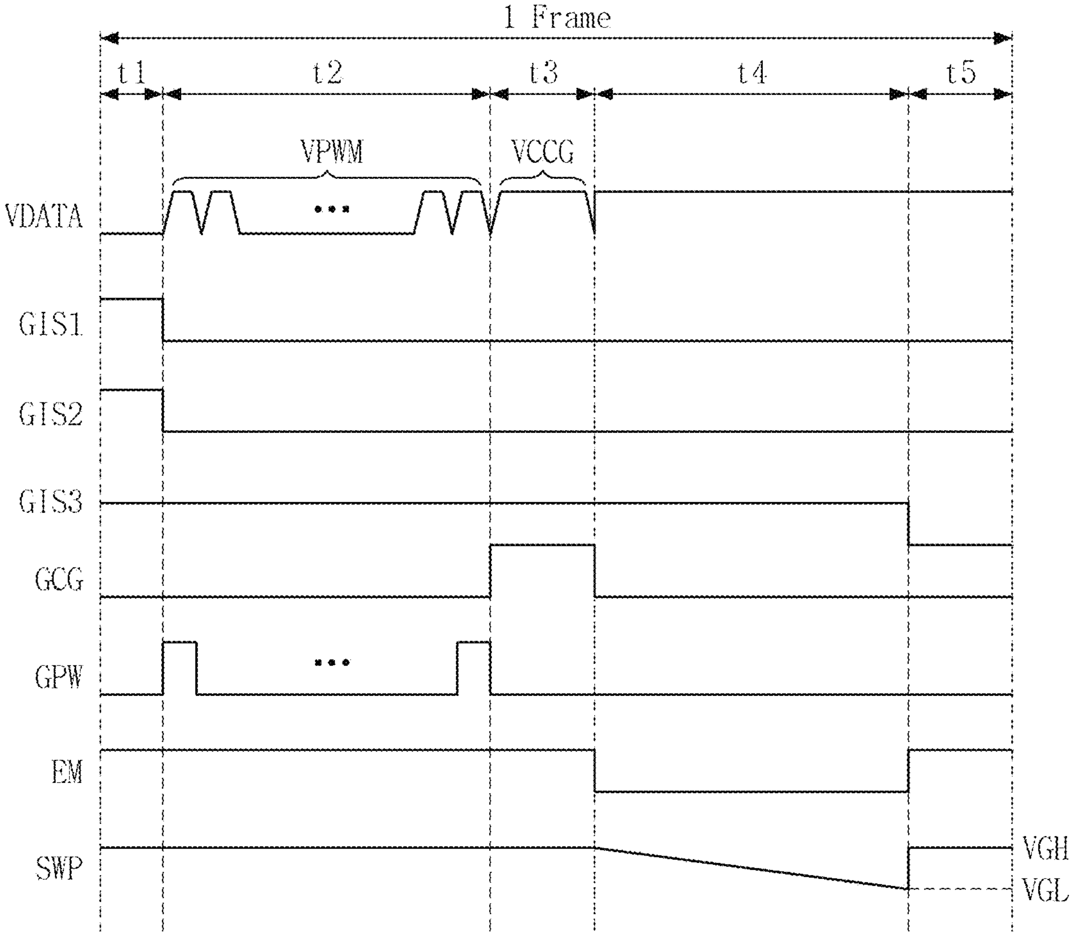
FIG. 3 is a waveform diagram of signals transmitted to the pixel according to an embodiment.

FIG. 3 is a waveform diagram of signals transmitted to the pixel SP according to an embodiment.

Referring to FIG. 3, the pixel SP may be connected to the first scan initialization line GIL1, the second scan initialization line GIL2, the third scan initialization line GIL3, the first scan write line GPWL, the second scan write line GCGL, the emission line EML, the sweep line SWPL, and the data line DL.

The first scan initialization line GIL1 may supply a first scan initialization signal GIS1 at a high level during a first period t1 of one frame period. The second scan initialization line GIL2 may supply a second scan initialization signal GIS2 at a high level during the first period t1. The third scan initialization line GIL3 may supply a third scan initialization signal GIS3 at a low level during a fifth period t5. The first scan write line GPWL may supply a first scan write signal GPW at a high level during a second period t2. The second scan write line GCGL may supply a second scan write signal GCG at a high level during a third period t3. The emission line EML may supply an emission signal EM at a low level during a fourth period t4. The sweep line SWPL may supply a sweep signal SWP during the fourth period t4. The sweep signal SWP may have a pulse that linearly decreases from a gate-high voltage VGH to a gate-low voltage VGL. A data voltage VDATA of the data line DL may be a first data voltage VPWM during the second period t2 and may be a second data voltage VCCG during the third period t3. The first data voltage VPWM may be sequentially supplied to pixels SP arranged in a plurality of rows during the second period t2, and the second data voltage VCCG may be simultaneously supplied to the pixels SP arranged in the rows during the third period t3.

Figure 4:
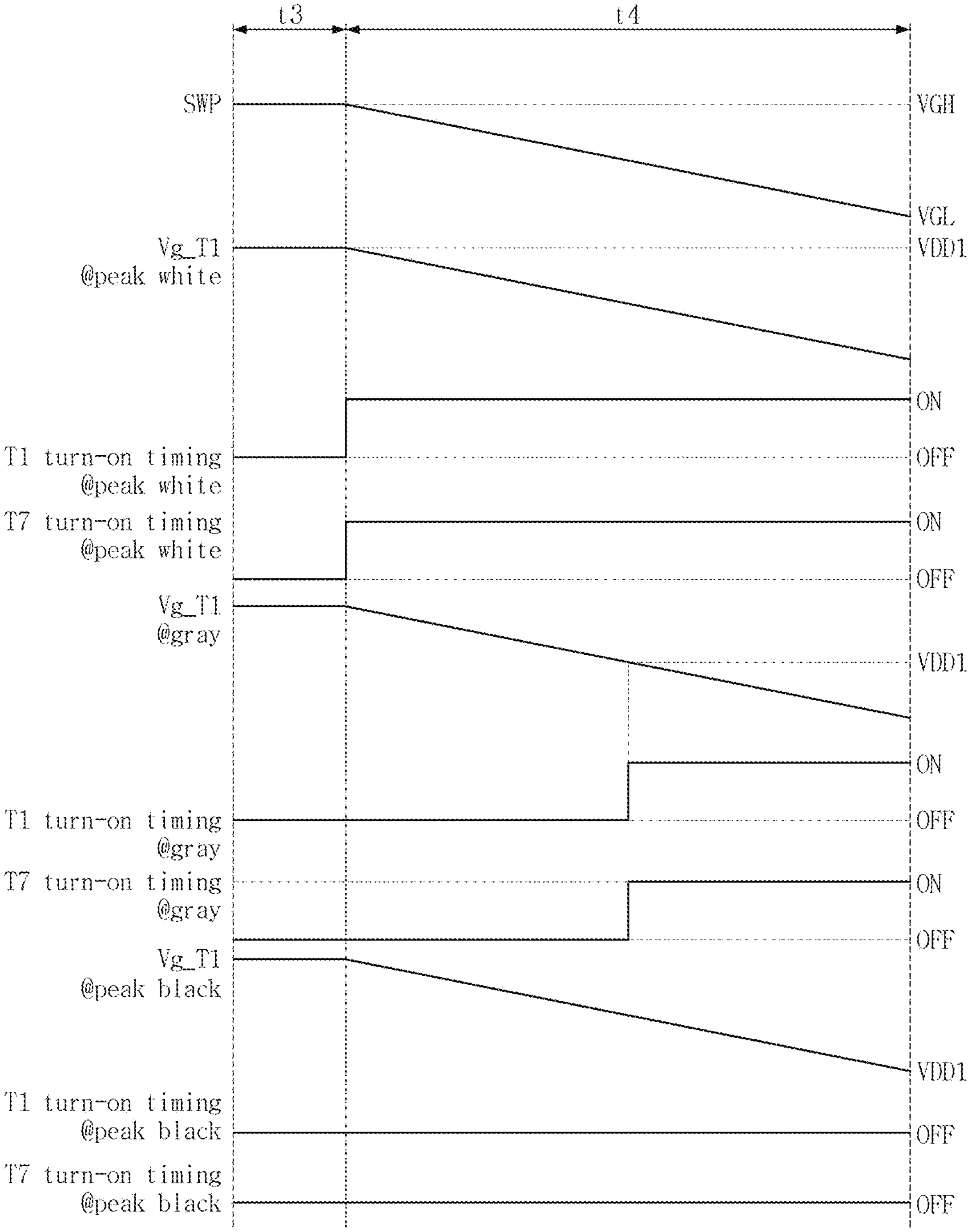
FIG. 4 is a timing diagram illustrating turn-on timing of first and seventh transistors in third and fourth periods of FIG. 3.

FIG. 4 is a timing diagram illustrating turn-on timing of the first and seventh transistors T1 and T7 in the third and fourth periods t3 and t4 of FIG. 3.

Referring to FIG. 4, in case that the first data voltage VPWM has a peak white grayscale value, a voltage Vg_T1 of the gate electrode of the first transistor T1 may have the first high-potential voltage VDD1 during the third period t3 and may decrease according to the sweep signal SWP during the fourth period t4. A source-gate voltage (Vsg=VDD1−Vg_T1) of the first transistor T1 may be greater than a threshold voltage Vth during the fourth period t4, and the first transistor T1 may be turned on throughout (or during) the fourth period t4. The control current Ic of the first transistor T1 may be supplied to the fourth node N4 throughout (or during) the fourth period t4, and the seventh transistor T7 may be turned on throughout (or during) the fourth period t4. The driving current Idr may be applied to the light emitting element ED throughout (or during) the fourth period t4, and the light emitting element ED may emit light throughout (or during) the fourth period t4.

In case that the first data voltage VPWM is a data voltage of a gray grayscale level, the voltage Vg_T1 of the gate electrode of the first transistor T1 may have a voltage greater than the first high-potential voltage VDD1 during the third period t3 and may decrease according to the sweep signal SWP during the fourth period t4. The voltage Vg_T1 of the gate electrode of the first transistor T1 may decrease from a voltage greater than the first high-potential voltage VDD1 to a voltage smaller than the first high-potential voltage VDD1 during the fourth period t4. The first transistor T1 may be turned on during a second half of the fourth period t4 as a voltage of the sweep signal SWP decreases. For example, a length of the second half of the fourth period t4 may vary according to the value of the first data voltage VPWM. The control current Ic of the first transistor T1 may flow to the fourth node N4 during the second half of the fourth period t4, and the voltage of the fourth node N4 may have a gate-on level during the second half of the fourth period t4. Therefore, the seventh transistor T7 may be turned on during the second half of the fourth period t4. The driving current Idr may not be applied to the light emitting element ED during a first half of the fourth period t4 and may be applied to the light emitting element ED during the second half of the fourth period t4. Therefore, the light emitting element ED may emit light during the second half of the fourth period t4.

In case that the first data voltage VPWM is a data voltage of a peak black grayscale level, the voltage Vg_T1 of the gate electrode of the first transistor T1 may have a voltage greater than the first high-potential voltage VDD1 during the third period t3 and may decrease according to the sweep signal SWP during the fourth period t4. The voltage Vg_T1 of the gate electrode of the first transistor T1 may decrease from a voltage greater than the first high-potential voltage VDD1 to the first high-potential voltage VDD1 during the fourth period t4. The source-gate voltage (Vsg=VDD1−Vg_T1) of the first transistor T1 may be smaller than the threshold voltage Vth during the fourth period t4, and the first transistor T1 may be turned off throughout (or during) the fourth period t4. The control current Ic of the first transistor T1 may not be supplied to the fourth node N4 throughout (or during) the fourth period t4, and the seventh transistor T7 may be turned off throughout (or during) the fourth period t4. Therefore, the driving current Idr may not be applied to the light emitting element ED throughout (or during) the fourth period t4, and the light emitting element ED may not emit light throughout (or during) the fourth period t4.

For example, a light emission period of the light emitting element ED may be adjusted by adjusting the first data voltage VPWM applied to the gate electrode of the first transistor T1.

Therefore, the grayscale level or luminance displayed by the pixel SP may be adjusted by maintaining the magnitude of the driving current Idr applied to the light emitting element ED to be constant and by adjusting the pulse width of the voltage applied to the first electrode of the light emitting element ED.

For example, in case that digital video data converted into data voltages is 8 bits, digital video data converted into a data voltage of the peak black grayscale level may be 0, and digital video data converted into a data voltage of the peak white grayscale level may be 255. Data voltages of gray grayscale levels may be data other than 0 and 255.

Figure 5:
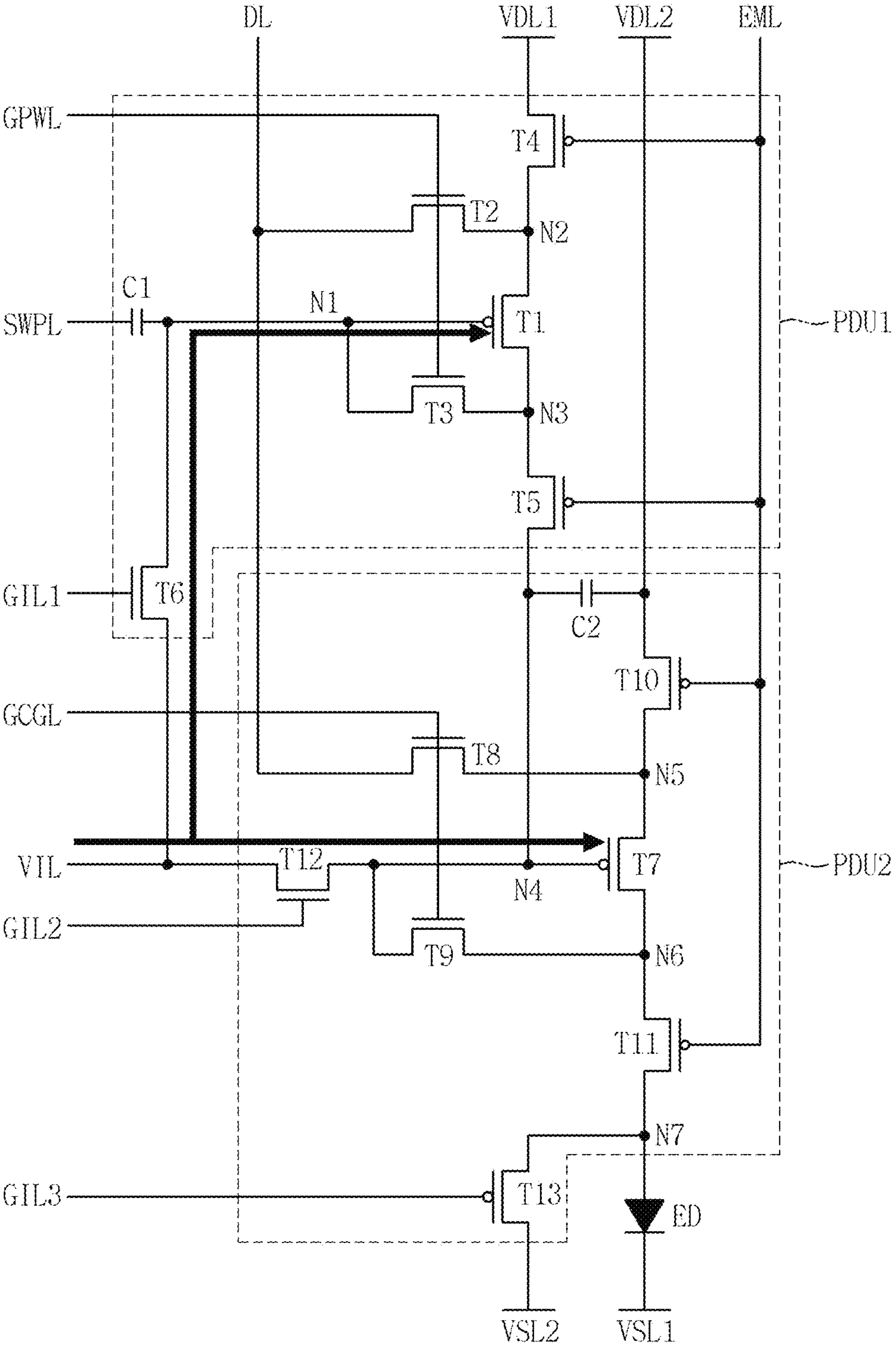
FIG. 5 is a schematic diagram of an equivalent circuit illustrating the operation of a pixel during a first period in the display device according to an embodiment.

FIG. 5 is a schematic diagram of an equivalent circuit illustrating the operation of a pixel during the first period t1 in the display device according to an embodiment.

Referring to FIG. 5 in conjunction with FIG. 3, the sixth transistor T6 may be turned on based on the first scan initialization signal GIS1 during the first period t1, and the twelfth transistor T12 may be turned on based on the second scan initialization signal GIS2 during the first period t1. The sixth transistor T6 may discharge the first node N1, which is the gate electrode of the first transistor T1, to the initialization voltage VINT, and the twelfth transistor T12 may discharge the fourth node N4, which is the gate electrode of the seventh transistor T7, to the initialization voltage VINT.

Figure 6:
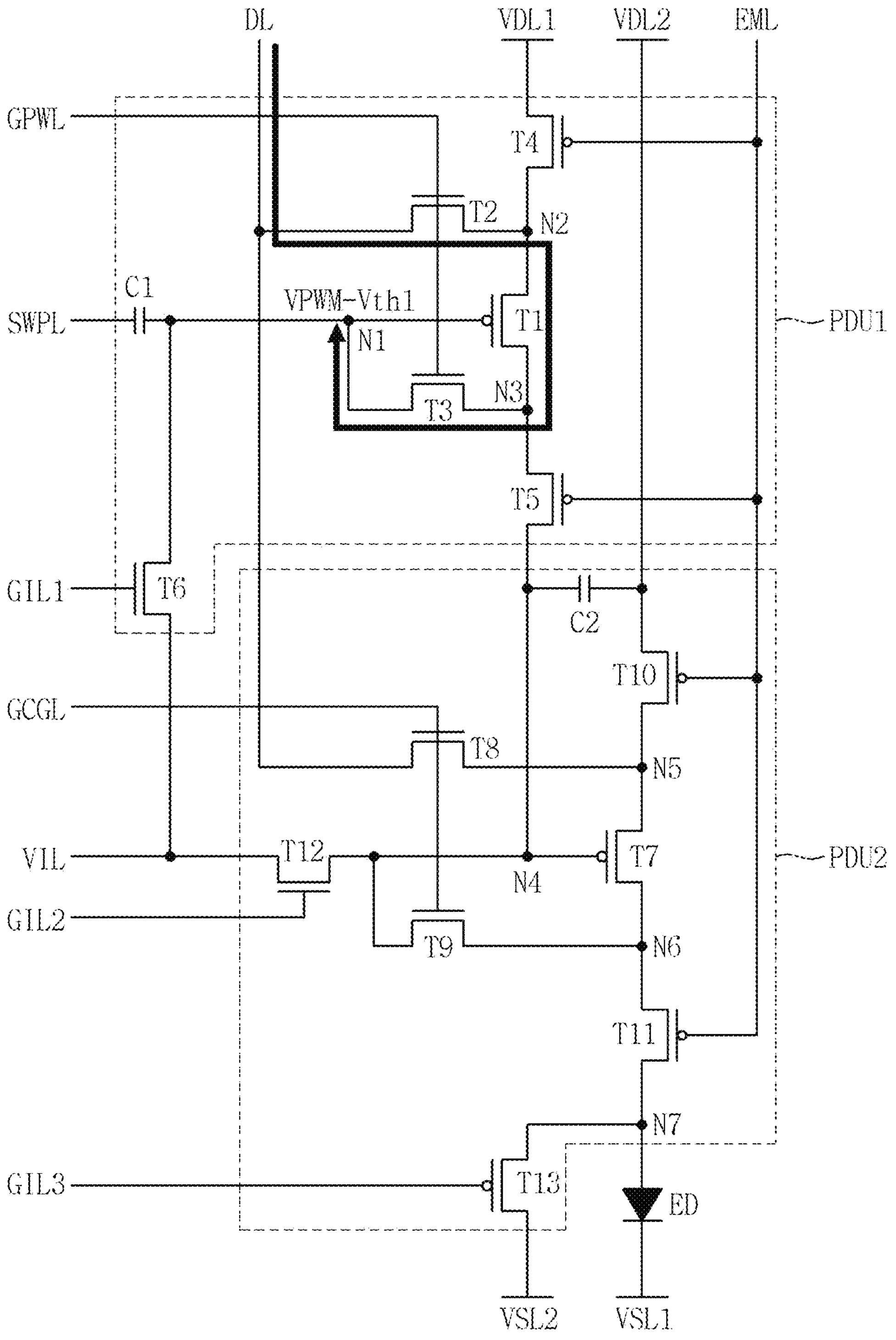
FIG. 6 is a schematic diagram of an equivalent circuit illustrating the operation of the pixel during a second period in the display device according to an embodiment.

FIG. 6 is a schematic diagram of an equivalent circuit illustrating the operation of the pixel during the second period t2 in the display device of FIG. 2.

Referring to FIG. 6 in conjunction with FIG. 3, the second and third transistors T2 and T3 may be turned on based on the first scan write signal GPW during the second period t2. The first data voltage VPWM may be supplied to the second node N2, which is the first electrode of the first transistor T1, through the second transistor T2. In case that the third transistor T3 is turned on, the third node N3 which is the second electrode of the first transistor T1 and the first node N1 which is the gate electrode of the first transistor T1 may be electrically connected to each other. The first transistor T1 may be turned on until the source-gate voltage Vsg reaches a threshold voltage Vth1. Therefore, the voltage of the first node N1, which is the gate electrode of the first transistor T1, may increase from "VINT" to "VPWM−Vth1". For example, in case that the first transistor T1 is implemented as a P-type MOSFET, the threshold voltage Vth1 of the first transistor T1 may be greater than 0 V, but embodiments are not limited thereto.

Figure 7:
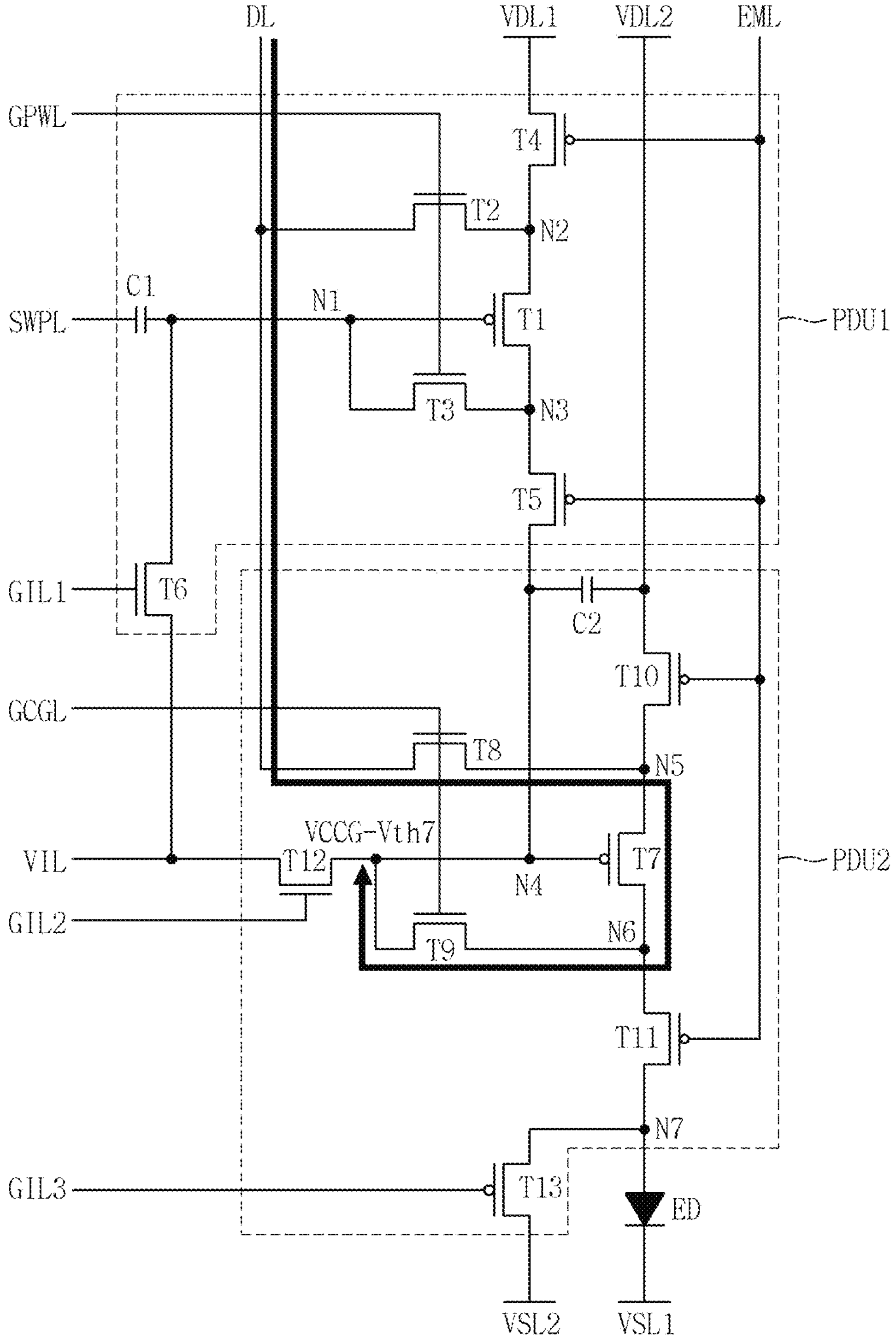
FIG. 7 is a schematic diagram of an equivalent circuit illustrating the operation of the pixel during the third period in the display device according to an embodiment.

FIG. 7 is a schematic diagram of an equivalent circuit illustrating the operation of the pixel during the third period t3 in the display device of FIG. 2.

Referring to FIG. 7 in conjunction with FIG. 3, the eighth and ninth transistors T8 and T9 may be turned on based on the second scan write signal GCG during the third period t3. The second data voltage VCCG may be supplied to the fifth node N5, which is the first electrode of the seventh transistor T7, through the eighth transistor T8. In case that the ninth transistor T9 is turned on, the sixth node N6 which is the second electrode of the seventh transistor T7 and the fourth node N4 which is the gate electrode of the seventh transistor T7 may be electrically connected to each other. Therefore, the seventh transistor T7 may be turned on until the source-gate voltage Vsg reaches a threshold voltage Vth7. Therefore, the voltage of the fourth node N4, which is the gate electrode of the seventh transistor T7, may increase from "VINT" to "VCCG−Vth7". For example, in case that the seventh transistor T7 is implemented as a P-type MOSFET, the threshold voltage Vth7 of the seventh transistor T7 may be greater than 0V, but embodiments are not limited thereto.

Figure 8:
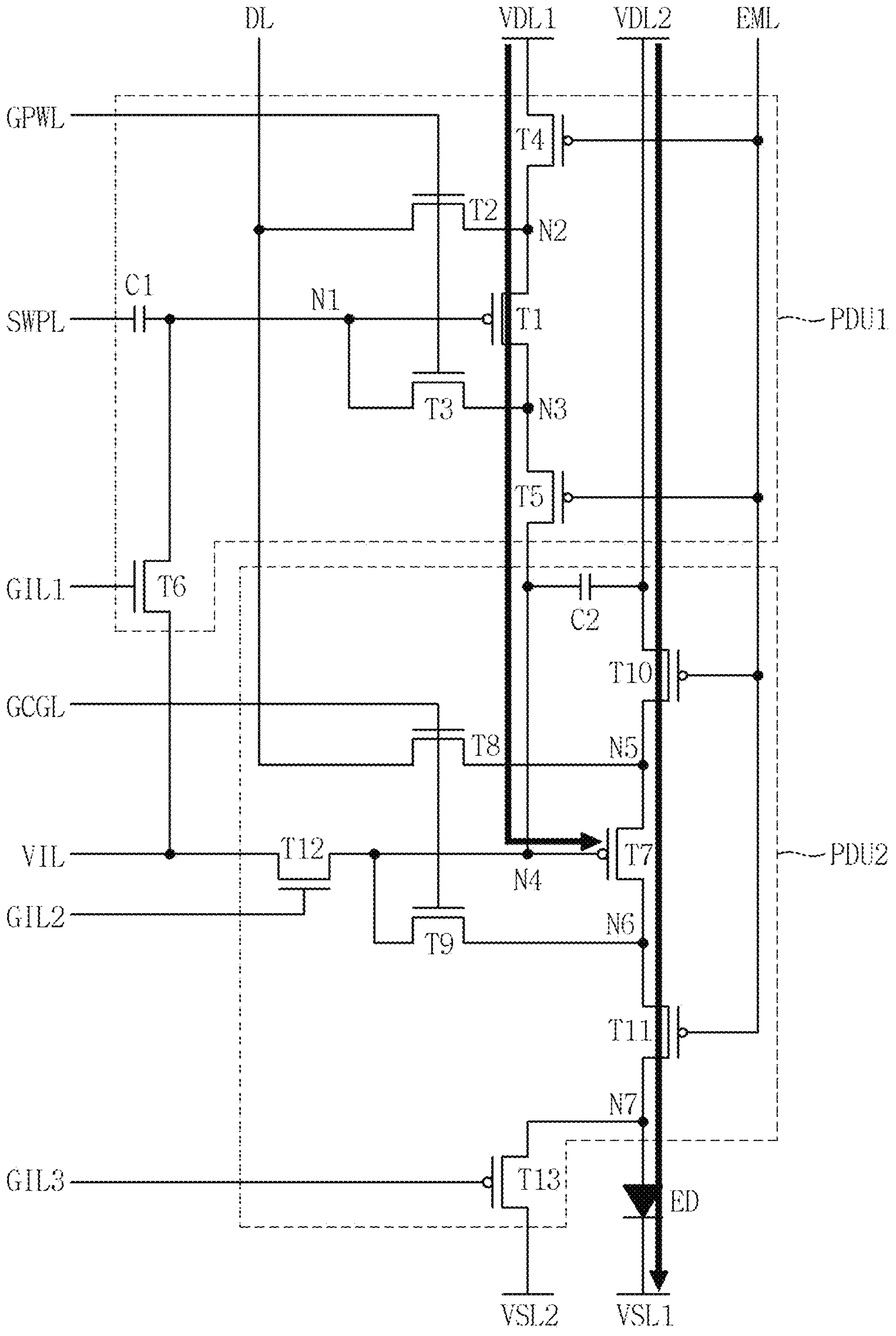
FIG. 8 is a schematic diagram of an equivalent circuit illustrating the operation of the pixel during the fourth period in the display device according to an embodiment.

FIG. 8 is a schematic diagram of an equivalent circuit illustrating the operation of the pixel during the fourth period t4 in the display device of FIG. 2.

Referring to FIG. 8 in conjunction with FIG. 3, the fourth, fifth, tenth, and eleventh transistors T4, T5, T10, and T11 may be turned on based on the emission signal EM during the fourth period t4.

As illustrated in FIG. 4, in case that the first data voltage VPWM has a peak white grayscale value, the first transistor T1 may be turned on throughout (or during) the fourth period t4 to supply the control current Ic to the fourth node N4, and the seventh transistor T7 may be turned on throughout (or during) the fourth period t4. Therefore, the driving current Idr may be applied to the light emitting element ED throughout (or during) the fourth period t4, and the light emitting element ED may emit light throughout (or during) the fourth period t4.

In case that the first data voltage VPWM is a data voltage of a gray grayscale level, the control current Ic of the first transistor T1 may flow to the fourth node N4 during the second half of the fourth period t4, and the voltage of the fourth node N4 may have a gate-on level during the second half of the fourth period t4. For example, the length of the second half of the fourth period t4 may vary according to the value of the first data voltage VPWM. Therefore, the seventh transistor T7 may be turned on during the second half of the fourth period t4. The driving current Idr may not be applied to the light emitting element ED during the first half of the fourth period t4 and may be applied to the light emitting element ED during the second half of the fourth period t4. Therefore, the light emitting element ED may emit light during the second half of the fourth period t4.

In case that the first data voltage VPWM is a data voltage of a peak black grayscale level, the first transistor T1 may be turned off throughout (or during) the fourth period t4. Therefore, the control current Ic may not be supplied to the fourth node N4 throughout (or during) the fourth period t4, and the seventh transistor T7 may be turned off throughout (or during) the fourth period t4. Accordingly, the driving current Idr may not be applied to the light emitting element ED throughout (or during) the fourth period t4, and the light emitting element ED may not emit light throughout (or during) the fourth period t4.

Figure 9:
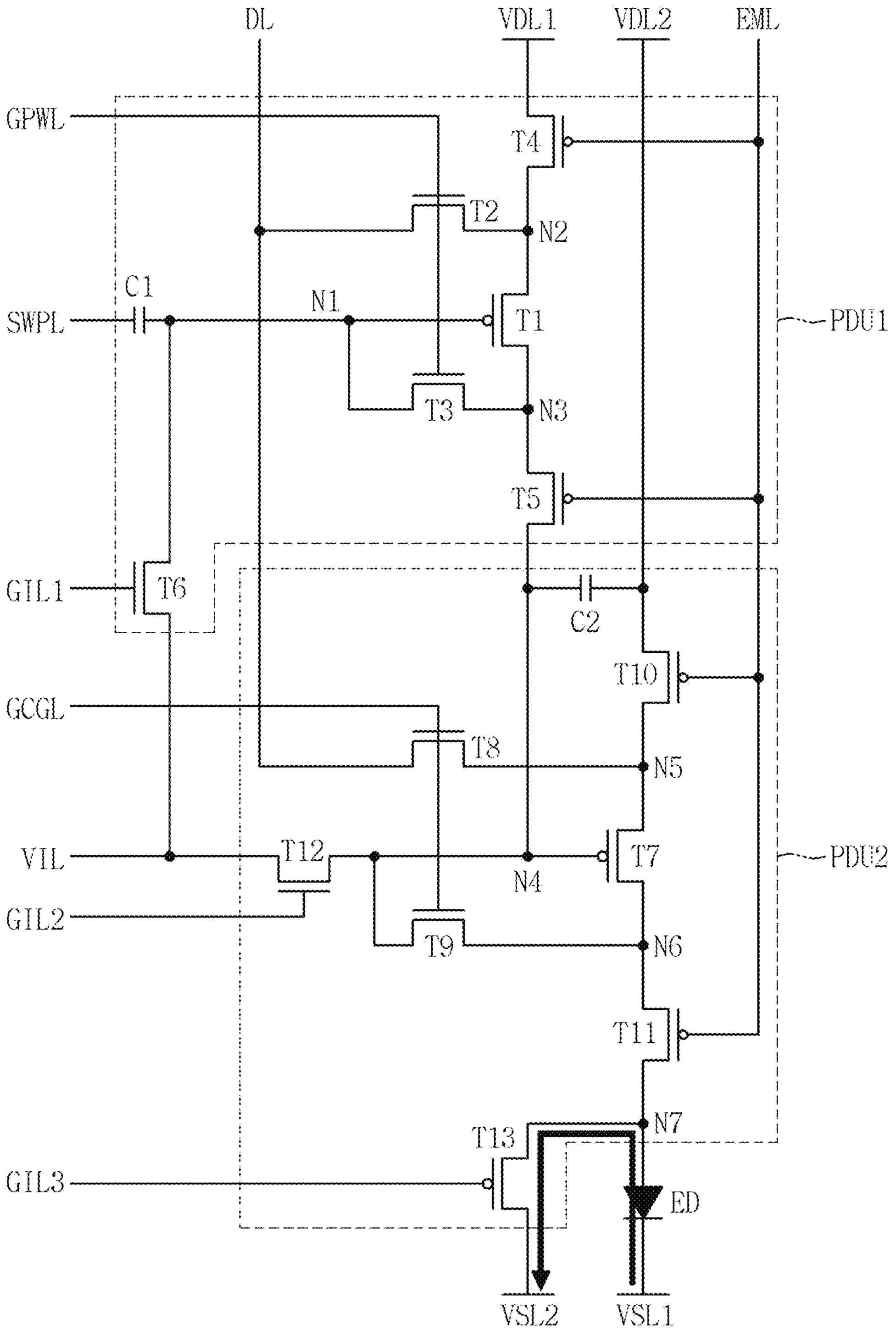
FIG. 9 is a schematic diagram of an equivalent circuit illustrating the operation of the pixel during a fifth period in the display device according to an embodiment.

FIG. 9 is a schematic diagram of an equivalent circuit illustrating the operation of the pixel during the fifth period t5 in the display device of FIG. 2.

Referring to FIG. 9 in conjunction with FIG. 3, the thirteenth transistor T13 may be turned on based on the third scan initialization signal GIS3 during the fifth period t5. The twelfth transistor T12 may be turned on based on the third scan initialization signal GIS3 during the fifth period t5 to discharge the seventh node N7, which is the first electrode of the light emitting element ED, to the second low-potential voltage VSS2.

The number of transistors and signal lines may be reduced compared with a pixel circuit including a pulse width modulation unit and a constant current generation unit. Therefore, the display device 10 may reduce power consumption, readily perform variable frequency driving, and improve the expression of the peak black grayscale level.

Figure 10:
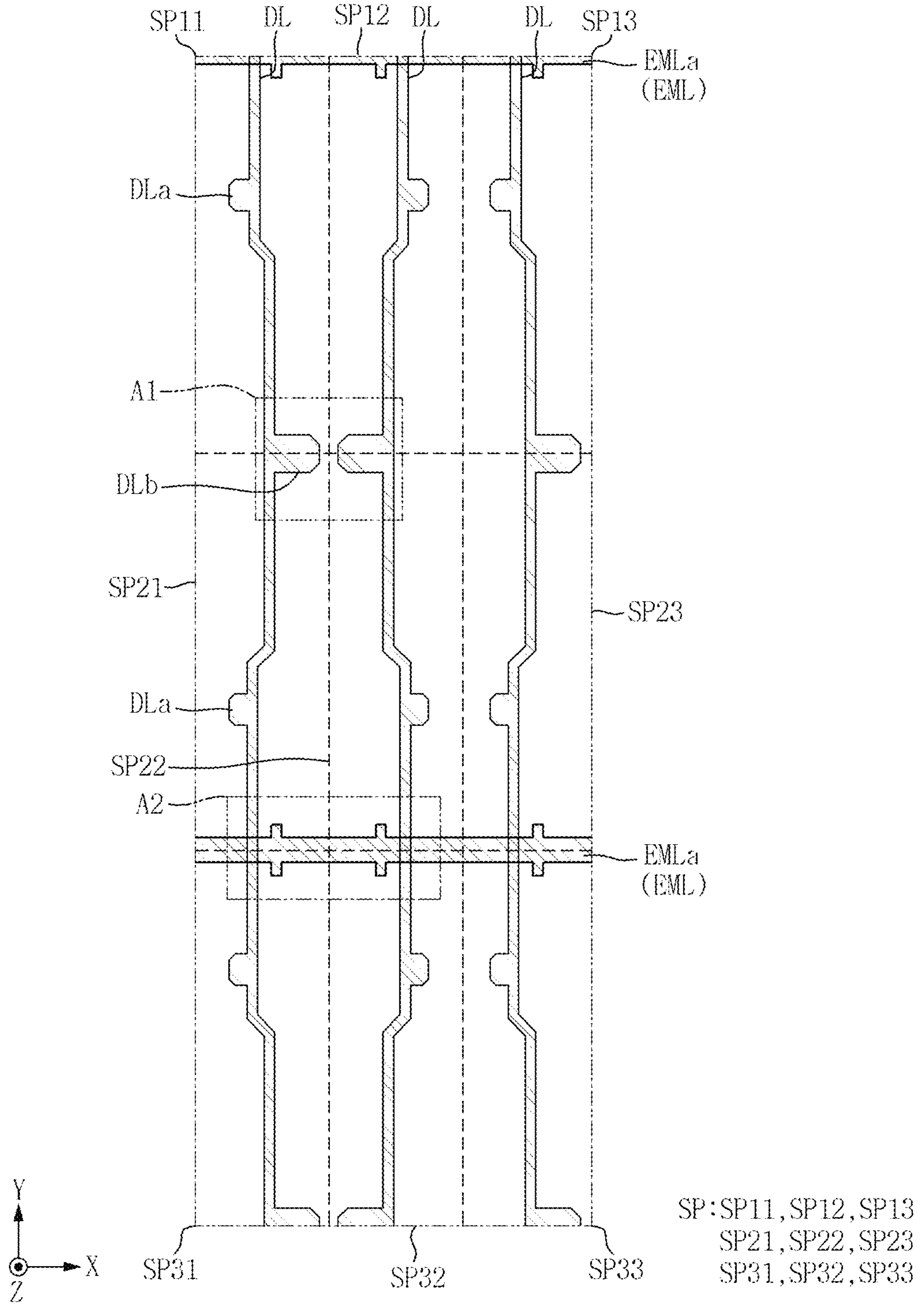
FIG. 10 illustrates data lines and emission control lines in the display device according to an embodiment.

FIG. 10 illustrates data lines DL and emission lines EML in the display device according to an embodiment.

Referring to FIG. 10, pixels SP may be arranged in a plurality of rows and a plurality of columns. The pixels SP may include a (1-1)$^{th}$ pixel SP11 disposed in a first row and a first column, a (1-2)$^{th}$ pixel SP12 disposed in the first row and a second column, a (1-3)$^{th}$ pixel SP13 disposed in the first row and a third column, a (2-1)$^{th}$ pixel SP21 disposed in a second row and the first column, a (2-2)$^{th}$ pixel SP22 disposed in the second row and the second column, a (2-3)$^{th}$ pixel SP23 disposed in the second row and the third column, a (3-1)$^{th}$ pixel SP31 disposed in a third row and the first column, a (3-2)$^{th}$ pixel SP32 disposed in the third row and the second column, and a (3-3)$^{th}$ pixel SP33 disposed in the third row and the third column.

For example, pixel circuits of the (1-1)$^{th}$ pixel SP11 and the (1-2)$^{th}$ pixel SP12 adjacent to each other in the X-axis direction may be designed to be vertically symmetrical to each other. Pixel circuits of the (1-1)$^{th}$ pixel SP11 and the (2-1)$^{th}$ pixel SP21 adjacent to each other in the Y-axis direction may be designed to be horizontally symmetrical to each other.

Pixels SP arranged in the same column may share a data line (e.g., single data line) DL. First portions DLa of the data line DL may be electrically connected to the first electrodes of the second transistors T2 of the pixels SP to supply the first data voltage. Second portions DLb of the data line DL may be electrically connected to the eighth transistors T8 of the pixels SP to supply the second data voltage. For example, since the (1-1)$^{th}$ pixel SP11 and the (2-1)$^{th}$ pixel SP21 are designed to be horizontally symmetrical, they may share a single second portion DLb of the data line DL. The second portion DLb of the data line DL may supply the second data voltage to the (1-1)$^{th}$ pixel SP11 and the (2-1)$^{th}$ pixel SP21 through the same contact hole. Therefore, the display device 10 may increase the integration density of pixel circuits by reducing the number of contact holes, thereby realizing high-resolution image quality.

First portions EMLa of the emission lines EML may be electrically connected to the gate electrodes of the fourth transistors T4 of the pixels SP to supply emission signals. For example, since the (2-1)$^{th}$ pixel SP21 and the (3-1)$^{th}$ pixel SP31 are designed to be horizontally symmetrical, they may share a single first portion EMLa of an emission line EML. The first portion EMLa of the emission line EML may overlap a boundary area of the (2-1)$^{th}$ pixel SP21 and the (3-1)$^{th}$ pixel SP31. The first portion EMLa of the emission line EML may supply an emission signal to the (2-1)$^{th}$ pixel SP21 disposed on an upper side and the (3-1)$^{th}$ pixel SP31 disposed on a lower side. Therefore, the display device 10 may increase the integration density of pixel circuits by reducing the number of emission lines EML, thereby realizing high-resolution image quality.

Figure 11:
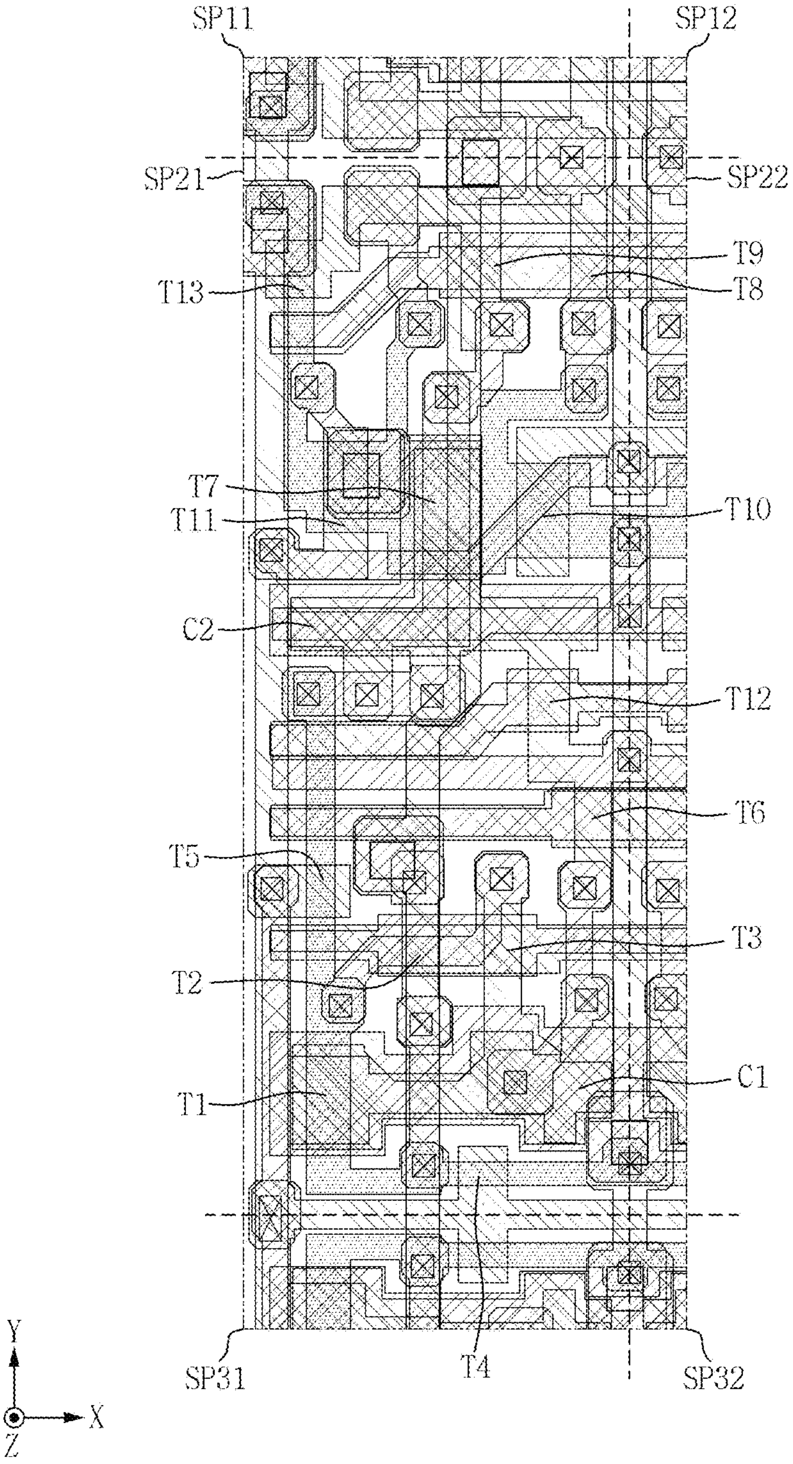
FIG. 11 is a layout view of a pixel of the display device according to an embodiment.
Figure 12:
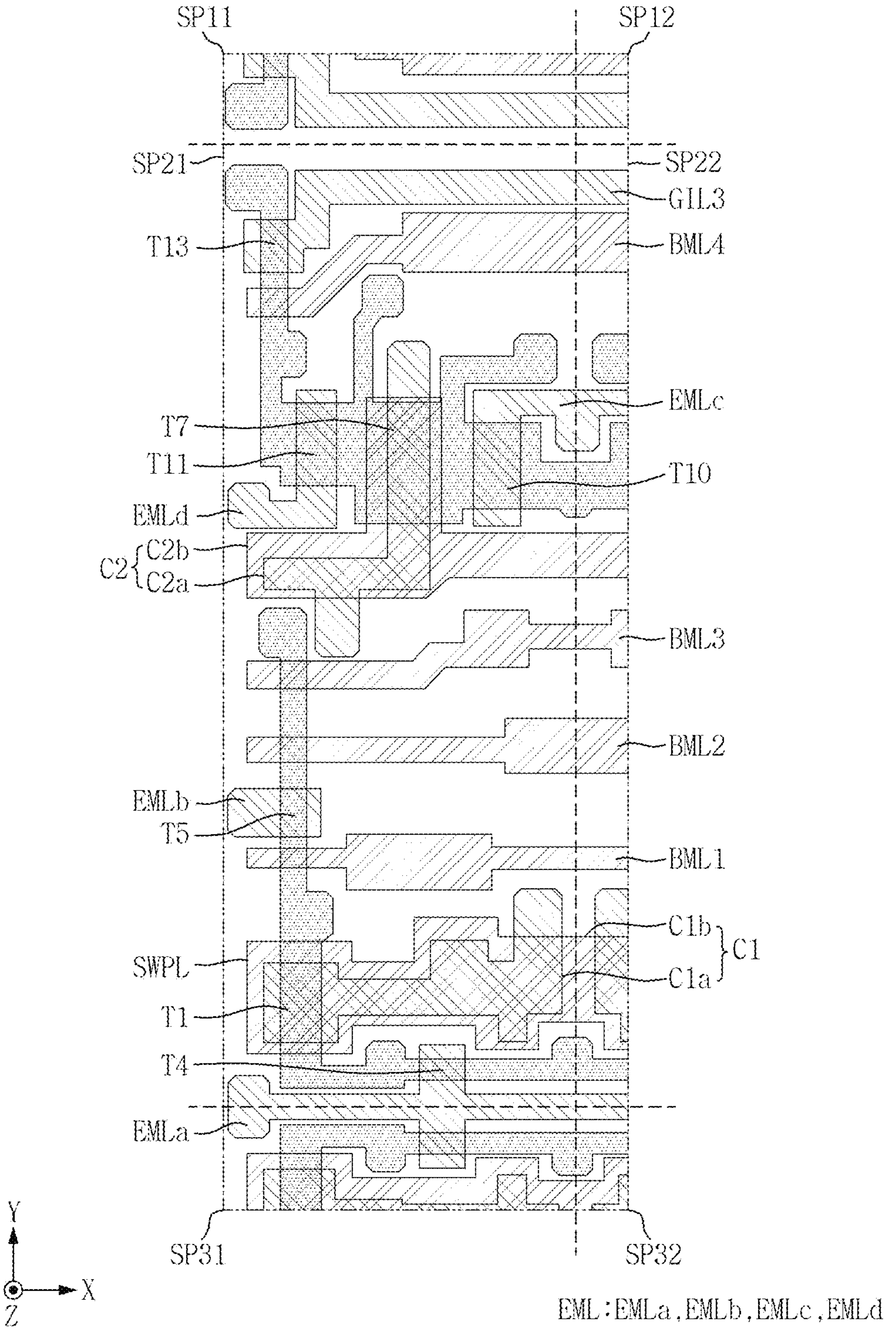
FIG. 12 illustrates some layers of the layout view of FIG. 11.

FIG. 11 is a layout view of a pixel SP of the display device according to an embodiment. FIG. 12 illustrates some layers of the layout view of FIG. 11, e.g., a stacked structure of a first active layer ACTL1, a first gate layer GTL1, and a second gate layer GTL2.

Figure 13:
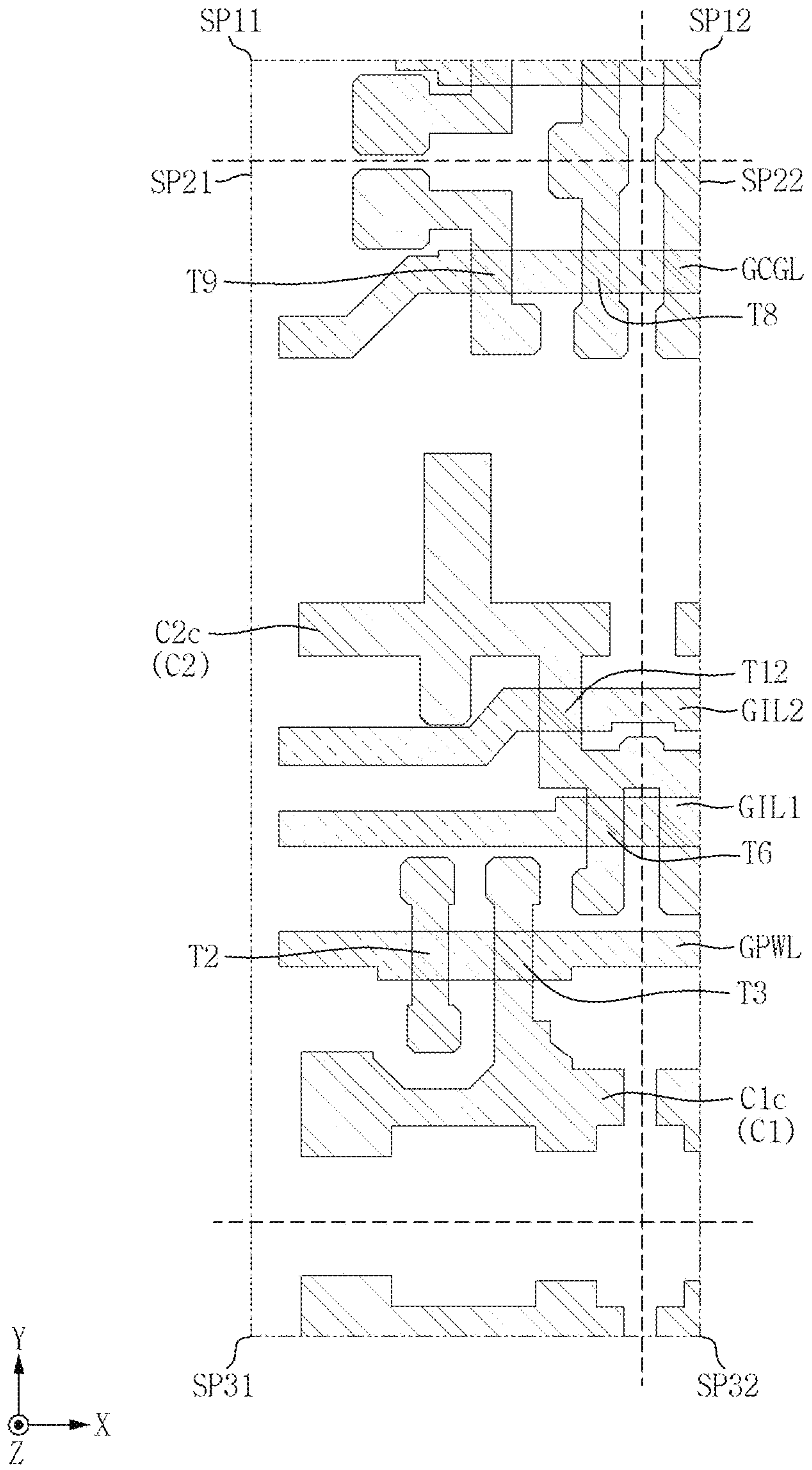
FIG. 13 illustrates some other layers of the layout view of FIG. 11.
Figure 14:
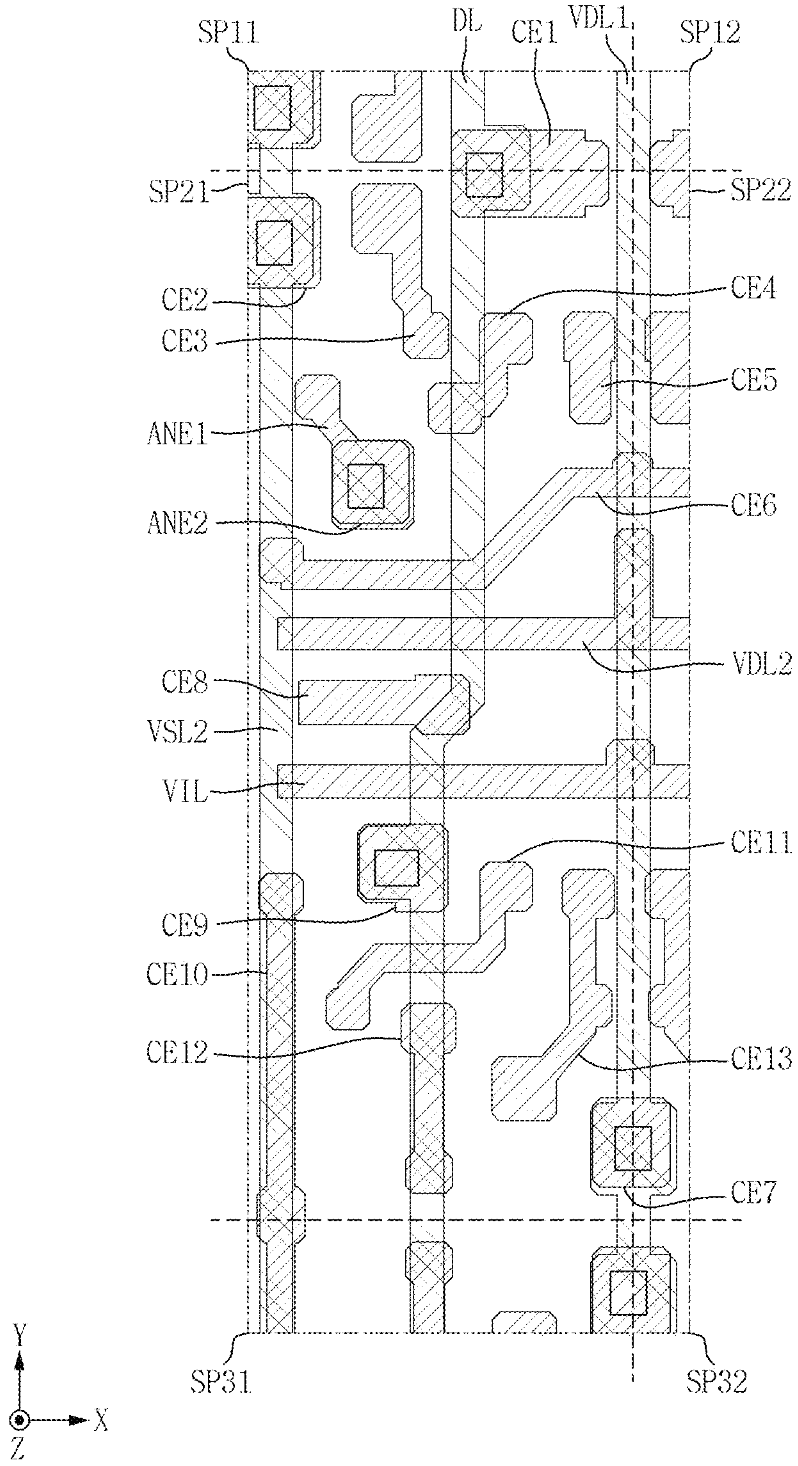
FIG. 14 illustrates some other layers of the layout view of FIG. 11.
Figure 15:
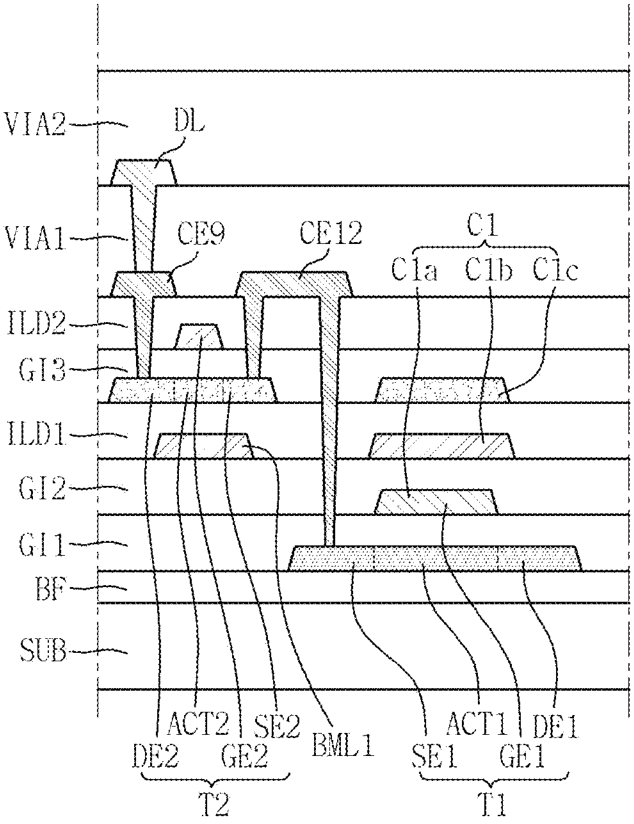
FIG. 15 is a cross-sectional view of a part of the display device according to an embodiment.

FIG. 13 illustrates some other layers of the layout view of FIG. 11, e.g., a stacked structure of a second active layer ACTL2 and a third gate layer GTL3. FIG. 14 illustrates some other layers of the layout view of FIG. 11, e.g., a stacked structure of a first source metal layer SDL1 and a second source metal layer SDL2. FIG. 15 is a cross-sectional view of a part of the display device according to an embodiment.

Referring to FIGS. 11 through 15, the pixels SP may be connected to a first scan initialization line GIL1, a second scan initialization line GIL2, a third scan initialization line GIL3, a first scan write line GPWL, a second scan write line GCGL, an emission line EML, a sweep line SWPL, a data line DL, a first high-potential line VDL1, and a second high-potential line VDL2.

The emission line EML may include a first portion EMLa, a second portion EMLb, a third portion EMLc, and a fourth portion EMLd. The first through fourth portions EMLa, EMLb, EMLc and EMLd of the emission line EML may be electrically connected to each other and may be spaced apart from each other in a single pixel SP. The first and second portions EMLa and EMLb of the emission line EML may be electrically connected through a tenth connection electrode CE10 of the first source metal layer SDL1. The third and fourth portions EMLc and EMLd of the emission line EML may be electrically connected through a sixth connection electrode CE6 of the first source metal layer SDL1. The first portion EMLa of the emission line EML may supply an emission signal to a gate electrode of a fourth transistor T4. The second portion EMLb of the emission line EML may supply an emission signal to a gate electrode of a fifth transistor T5. The third portion EMLc of the emission line EML may supply an emission signal to a gate electrode of a tenth transistor T10. The fourth portion EMLd of the emission line EML may supply an emission signal to a gate electrode of an eleventh transistor T11. For example, in the (2-1)$^{th}$ pixel SP, the first portion EMLa of the emission line EML may be disposed at the bottom of the (2-1)$^{th}$ pixel SP, and the second portion EMLb may be disposed between first and second light blocking layers BML1 and BML2. The third portion EMLc and the fourth portion EMLd of the emission line EML may be disposed between a second capacitor electrode C2*b* of a second capacitor C2 and a fourth light blocking layer BML4. The third portion EMLc may be disposed on a right side of a seventh transistor T7, and the fourth portion EMLd may be disposed on a left side of the seventh transistor T7. For example, since pixels SP are designed to be symmetrical horizontally and vertically, positions of the first through fourth portions EMLa, EMLb, EMLc and EMLd of the emission line EML in the pixels SP may be different from those in the (2-1)$^{th}$ pixel SP21.

The pixel SP may include first through thirteenth transistors T1 through T13, first and second capacitors C1 and C2, and a light emitting element ED.

The first transistor T1 may include a semiconductor region ACT1, a gate electrode GE1, a first electrode SE1, and a second electrode DE1. The first electrode SE1 of the first transistor T1 may be a source electrode, and the second electrode DE1 may be a drain electrode. The semiconductor region ACT1, the first electrode SE1 and the second electrode DE1 of the first transistor T1 may be disposed in the first active layer ACTL1, and the gate electrode GE1 of the first transistor T1 may be disposed in the first gate layer GTL1. The gate electrode GE1 of the first transistor T1 may be a part of a first capacitor electrode C1*a* of the first capacitor C1 and may overlap the semiconductor region ACT1.

The first capacitor electrode C1*a* of the first capacitor C1 may be disposed in the first gate layer GTL1, a second capacitor electrode C1*b* may be disposed in the second gate layer GTL2, and a third capacitor electrode C1*c* may be disposed in the second active layer ACTL2. The first capacitor electrode C1*a* of the first capacitor C1 may include the gate electrode of the first transistor T1 and may be electrically connected to the third capacitor electrode C1*c* and a first electrode of the sixth transistor T6 through a thirteenth connection electrode CE13 of the first source metal layer SDL1. The second capacitor electrode C1*b* of the first capacitor C1 may be electrically connected to the sweep line SWPL. The third capacitor electrode C1*c* of the first capacitor C1 may include a second electrode of the third transistor T3. The second capacitor electrode C1*b* of the first capacitor C1 may be disposed between the first and third capacitor electrodes C1*a* and C1*c*, and the first and third capacitor electrodes C1*a* and C1*c* may be connected to each other. Accordingly, the first capacitor C1 may be doubly formed to secure capacitance capacity and reduce coupling capacitance between pixel circuits.

The first electrode SE1 of the first transistor T1 may be integral with a second electrode of the fourth transistor T4. The first electrode SE1 of the first transistor T1 may be electrically connected to a second electrode SE2 of the second transistor T2 through a twelfth connection electrode CE12 of the first source metal layer SDL1. The second electrode DE1 of the first transistor T1 may be integral with a first electrode of the fifth transistor T5. The second electrode DE1 of the first transistor T1 may be electrically connected to a first electrode of the third transistor T3 through an eleventh connection electrode CE11 of the first source metal layer SDL1.

The second transistor T2 may include a semiconductor region ACT2, a gate electrode GE2, a first electrode DE2, and the second electrode SE2. The semiconductor region ACT2, first electrode DE2 and second electrode SE2 of the second transistor T2 may be disposed in the second active layer ACTL2, and the gate electrode GE2 of the second transistor T2 may be disposed in the third gate layer GTL3. The gate electrode GE2 of the second transistor T2 may be a part of the first scan write line GPWL and may overlap the semiconductor region ACT2 of the second transistor T2.

The first electrode DE2 of the second transistor T2 may be electrically connected to the data line DL of the second source metal layer SDL2 through a ninth connection electrode CE9 of the first source metal layer SDL1. The second electrode SE2 of the second transistor T2 may be electrically connected to the first electrode SE1 of the first transistor T1 and the second electrode of the fourth transistor T4 through the twelfth connection electrode CE12.

The third transistor T3 may include a semiconductor region, a gate electrode, the first electrode, and the second electrode. The semiconductor region, first electrode and second electrode of the third transistor T3 may be disposed in the second active layer ACTL2, and the gate electrode of the third transistor T3 may be disposed in the third gate layer GTL3. The gate electrode of the third transistor T3 may be a part of the first scan write line GPWL and may overlap the semiconductor region of the third transistor T3.

The first electrode of the third transistor T3 may be electrically connected to the second electrode DE1 of the first transistor T1 and the first electrode of the fifth transistor T5 through the eleventh connection electrode CE11. The second electrode of the third transistor T3 may be electrically connected to the gate electrode GE1 of the first transistor T1 and the first electrode of the sixth transistor T6 through the thirteenth connection electrode CE13.

The fourth transistor T4 may include a semiconductor region, the gate electrode, a first electrode, and the second electrode. The semiconductor region, first electrode and second electrode of the fourth transistor T4 may be disposed in the first active layer ACTL1, and the gate electrode of the fourth transistor T4 may be disposed in the first gate layer GTL1. The gate electrode of the fourth transistor T4 may be a part of the first portion EMLa of the emission line EML and may overlap the semiconductor region of the fourth transistor T4.

The first electrode of the fourth transistor T4 may be electrically connected to the first high-potential line VDL1 of the second source metal layer SDL2 through a seventh connection electrode CE7 of the first source metal layer SDL1. The second electrode of the fourth transistor T4 may be integral with the first electrode SE1 of the first transistor T1. The second electrode of the fourth transistor T4 may be electrically connected to the second electrode SE2 of the second transistor T2 through the twelfth connection electrode CE12.

The fifth transistor T5 may include a semiconductor region, the gate electrode, the first electrode, and a second electrode. The semiconductor region, first electrode and second electrode of the fifth transistor T5 may be disposed in the first active layer ACTL1, and the gate electrode of the fifth transistor T5 may be disposed in the first gate layer GTL1. The gate electrode of the fifth transistor T5 may be a part of the second portion EMLb of the emission line EML and may overlap the semiconductor region of the fifth transistor T5.

The first electrode of the fifth transistor T5 may be integral with the second electrode DE1 of the first transistor T1. The first electrode of the fifth transistor T5 may be electrically connected to the first electrode of the third transistor T3 through the eleventh connection electrode CE11. The second electrode of the fifth transistor T5 may be electrically connected to a first capacitor electrode C2*a* and a third capacitor electrode C2*c* of the second capacitor C2 through an eighth connection electrode CE8 of the first source metal layer SDL1.

The sixth transistor T6 may include a semiconductor region, a gate electrode, the first electrode, and a second electrode. The semiconductor region, first electrode and second electrode of the sixth transistor T6 may be disposed in the second active layer ACTL2, and the gate electrode of the sixth transistor T6 may be disposed in the third gate layer GTL3. The gate electrode of the sixth transistor T6 may be a part of the first scan initialization line GIL1 and may overlap the semiconductor region of the sixth transistor T6.

The first electrode of the sixth transistor T6 may be electrically connected to the first and third capacitor electrodes C1*a* and C1*c* of the first capacitor C1 through the thirteenth connection electrode CE13. The second electrode of the sixth transistor T6 may be electrically connected to the initialization voltage line VIL of the first source metal layer SDL1.

The seventh transistor T7 may include a semiconductor region, a gate electrode, a first electrode, and a second electrode. The semiconductor region, first electrode and second electrode of the seventh transistor T7 may be disposed in the first active layer ACTL1, and the gate electrode of the seventh transistor T7 may be disposed in the first gate layer GTL1. The gate electrode of the seventh transistor T7 may be a part of the first capacitor electrode C2*a* of the second capacitor C2 and may overlap the semiconductor region of the seventh transistor T7.

The first capacitor electrode C2*a* of the second capacitor C2 may be disposed in the first gate layer GTL1, the second capacitor electrode C2*b* may be disposed in the second gate layer GTL2, and the third capacitor electrode C2*c* may be disposed in the second active layer ACTL2. The first capacitor electrode C2*a* of the second capacitor C2 may include the gate electrode of the seventh transistor T7 and may be electrically connected to a second electrode of the ninth transistor T9 through a fourth connection electrode CE4 of the first source metal layer SDL1. The second capacitor electrode C2*b* of the second capacitor C2 may be electrically connected to the second high-potential line VDL2 of the first source metal layer SDL1. The third capacitor electrode C2*c* of the second capacitor C2 may include a first electrode of the twelfth transistor T12. The second capacitor electrode C2*b* of the second capacitor C2 may be disposed between the first and third capacitor electrodes C2*a* and C2*c*, and the first and third capacitor electrodes C2*a* and C2*c* may be connected to each other. Accordingly, the second capacitor C2 may be doubly formed to secure capacitance capacity and reduce coupling capacitance between pixel circuits.

The first electrode of the seventh transistor T7 may be integral with a second electrode of the tenth transistor T10. The first electrode of the seventh transistor T7 may be electrically connected to a second electrode of the eighth transistor T8 through a fifth connection electrode CE5 of the first source metal layer SDL1. The second electrode of the seventh transistor T7 may be integral with a first electrode of the eleventh transistor T11. The second electrode of the seventh transistor T7 may be electrically connected to a first electrode of the ninth transistor T9 through a third connection electrode CE3 of the first source metal layer SDL1.

The eighth transistor T8 may include a semiconductor region, a gate electrode, a first electrode, and the second electrode. The semiconductor region, first electrode and second electrode of the eighth transistor T8 may be disposed in the second active layer ACTL2, and the gate electrode of the eighth transistor T8 may be disposed in the third gate layer GTL3. The gate electrode of the eighth transistor T8 may be a part of the second scan write line GCGL and may overlap the semiconductor region of the eighth transistor T8.

The first electrode of the eighth transistor T8 may be electrically connected to the data line DL of the second source metal layer SDL2 through a first connection electrode CE1 of the first source metal layer SDL1. The second electrode of the eighth transistor T8 may be electrically connected to the first electrode of the seventh transistor T7 and the second electrode of the tenth transistor T10 through the fifth connection electrode CE5.

The ninth transistor T9 may include a semiconductor region, a gate electrode, the first electrode, and the second electrode. The semiconductor region, first electrode and second electrode of the ninth transistor T9 may be disposed in the second active layer ACTL2, and the gate electrode of the ninth transistor T9 may be disposed in the third gate layer GTL3. The gate electrode of the ninth transistor T9 may be a part of the second scan write line GCGL and may overlap the semiconductor region of the ninth transistor T9.

The first electrode of the ninth transistor T9 may be electrically connected to the second electrode of the seventh transistor T7 and the first electrode of the eleventh transistor T11 through the third connection electrode CE3. The second electrode of the ninth transistor T9 may be electrically connected to the first capacitor electrode C2*a* of the second capacitor C2 through the fourth connection electrode CE4.

The tenth transistor T10 may include a semiconductor region, the gate electrode, a first electrode, and the second electrode. The semiconductor region, first electrode and second electrode of the tenth transistor T10 may be disposed in the first active layer ACTL1, and the gate electrode of the tenth transistor T10 may be disposed in the first gate layer GTL1. The gate electrode of the tenth transistor T10 may be a part of the third portion EMLc of the emission line EML and may overlap the semiconductor region of the tenth transistor T10.

The first electrode of the tenth transistor T10 may be electrically connected to the second high-potential line VDL2. The second electrode of the tenth transistor T10 may be integral with the first electrode of the seventh transistor T7. The second electrode of the tenth transistor T10 may be electrically connected to the second electrode of the eighth transistor T8 through the fifth connection electrode CE5.

The eleventh transistor T11 may include a semiconductor region, a gate electrode, a first electrode, and the second electrode. The semiconductor region, first electrode and second electrode of the eleventh transistor T11 may be disposed in the first active layer ACTL1, and the gate electrode of the eleventh transistor T11 may be disposed in the first gate layer GTL1. The gate electrode of the eleventh transistor T11 may be a part of the fourth portion EMLd of the emission line EML and may overlap the semiconductor region of the eleventh transistor T11.

The first electrode of the eleventh transistor T11 may be integral with the second electrode of the seventh transistor T7. The first electrode of the eleventh transistor T11 may be electrically connected to the first electrode of the ninth transistor T9 through the third connection electrode CE3. The second electrode of the eleventh transistor T11 may be electrically connected to a first electrode of the light emitting element ED through a first anode connection electrode ANE1 of the first source metal layer SDL1 and a second anode connection electrode ANE2 of the second source metal layer SDL2. The second electrode of the eleventh transistor T11 may be electrically connected to a first electrode of the thirteenth transistor T13 through the first anode connection electrode ANE1.

The twelfth transistor T12 may include a semiconductor region, a gate electrode, the first electrode, and a second electrode. The semiconductor region, first electrode and second electrode of the twelfth transistor T12 may be disposed in the second active layer ACTL2, and the gate electrode of the twelfth transistor T12 may be disposed in the third gate layer GTL3. The gate electrode of the twelfth transistor T12 may be a part of the second scan initialization line GIL2 and may overlap the semiconductor region of the twelfth transistor T12.

The first electrode of the twelfth transistor T12 may be a part of the third capacitor electrode C2*c* of the second capacitor C2. The third capacitor electrode C2*c* of the second capacitor C2 may be electrically connected to the first capacitor electrode C2*a* of the second capacitor C2 and the second electrode of the fifth transistor T5 through the eighth connection electrode CE8. The second electrode of the twelfth transistor T12 may be electrically connected to the initialization voltage line VIL.

The thirteenth transistor T13 may include a semiconductor region, a gate electrode, the first electrode, and a second electrode. The semiconductor region, first electrode and second electrode of the thirteenth transistor T13 may be disposed in the first active layer ACTL1, and the gate electrode of the thirteenth transistor T13 may be disposed in the first gate layer GTL1. The gate electrode of the thirteenth transistor T13 may be a part of the third scan initialization line GIL3 and may overlap the semiconductor region of the thirteenth transistor T13.

The first electrode of the thirteenth transistor T13 may be electrically connected to the second electrode of the eleventh transistor T11 through the first anode connection electrode ANE1. The first electrode of the thirteenth transistor T13 may be electrically connected to the first electrode of the light emitting element ED through the first and second anode connection electrodes ANE1 and ANE2. The second electrode of the thirteenth transistor T13 may be electrically connected to a second low-potential line VSL2 of the second source metal layer SDL2 through a second connection electrode CE2 of the first source metal layer SDL1.

The first light blocking layer BML1 may be disposed in the second gate layer GTL2 and may extend in the X-axis direction. The first light blocking layer BML1 may overlap the semiconductor regions of the second and third transistors T2 and T3 and may block light from entering the semiconductor regions of the second and third transistors T2 and T3.

The second light blocking layer BML2 may be disposed in the second gate layer GTL2 and may extend in the X-axis direction. The second light blocking layer BML2 may overlap the semiconductor region of the sixth transistor T6 and block light from entering the semiconductor region of the sixth transistor T6.

A third light blocking layer BML3 may be disposed in the second gate layer GTL2 and may extend in the X-axis direction. The third light blocking layer BML3 may overlap the semiconductor region of the twelfth transistor T12 and block light from entering the semiconductor region of the twelfth transistor T12.

The fourth light blocking layer BML4 may be disposed in the second gate layer GTL2 and may extend in the X-axis direction. The fourth light blocking layer BML4 may overlap the semiconductor regions of the eighth and ninth transistors T8 and T9 and may block light from entering the semiconductor regions of the eighth and ninth transistors T8 and T9.

In FIG. 15, the display panel 100 may include a substrate SUB, a buffer layer BF, the first active layer ACTL1, a first gate insulating layer GI1, the first gate layer GTL1, a second gate insulating layer GI2, the second gate layer GTL2, a first interlayer insulating layer ILD1, the second active layer ACTL2, a third gate insulating layer GI3, the third gate layer GTL3, a second interlayer insulating layer ILD2, the first source metal layer SDL1, a first via layer VIA1, the second source metal layer SDL2, and a second via layer VIA2.

The substrate SUB may be a base substrate or a base member. The substrate SUB may be a flexible substrate that is bendable, foldable, rollable, etc. For example, the substrate SUB may include polymer resin such as polyimide (PI), but embodiments are not limited thereto. For another example, the substrate SUB may include a glass material or a metal material.

The buffer layer BF may be disposed on the substrate SUB. For example, the buffer layer BF may include an inorganic layer that prevents penetration of air or moisture. For example, the buffer layer BF may include a plurality of inorganic layers stacked alternately.

The first active layer ACTL1 may be disposed on the buffer layer BF. The first active layer ACTL1 may include a silicon-based material. For example, the first active layer ACTL1 may be made of low-temperature polycrystalline silicon (LTPS). The first active layer ACTL1 may include the semiconductor region ACT1, first electrode SE1 and second electrode DE1 of the first transistor T1.

The first gate insulating layer GI1 may be disposed on the first active layer ACTL1. The first gate insulating layer GI1 may insulate the first active layer ACTL1 from the first gate layer GTL1.

The first gate layer GTL1 may be disposed on the first gate insulating layer GI1. The first gate layer GTL1 may include the gate electrode GE1 of the first transistor T1. The gate electrode GE1 of the first transistor T1 may be a part of the first capacitor electrode C1*a* of the first capacitor C1.

The second gate insulating layer GI2 may be disposed on the first gate layer GTL1. The second gate insulating layer GI2 may insulate the first gate layer GTL1 from the second gate layer GTL2.

The second gate layer GTL2 may be disposed on the second gate insulating layer GI2. The second gate layer GTL2 may include the second capacitor electrode C1*b* of the first capacitor C1 and the first light blocking layer BML1. The second capacitor electrode C1*b* of the first capacitor C1 may overlap the first capacitor electrode C1*a*, and the first light blocking layer BML1 may overlap the semiconductor region ACT2 of the second transistor T2.

The first interlayer insulating layer ILD1 may be disposed on the second gate layer GTL2. The first interlayer insulating layer ILD1 may insulate the second gate layer GTL2 from the second active layer ACTL2.

The second active layer ACTL2 may be disposed on the first interlayer insulating layer ILD1. The second active layer ACTL2 may include an oxide-based material. The second active layer ACTL2 may include the semiconductor region ACT2, first electrode DE2 and second electrode SE2 of the second transistor T2 and the third capacitor electrode C1*c* of the first capacitor C1. The third capacitor electrode C1*c* of the first capacitor C1 may overlap the first and second capacitor electrodes C1*a* and C1*b*.

The third gate insulating layer GI3 may be disposed on the second active layer ACTL2. The third gate insulating layer GI3 may insulate the second active layer ACTL2 from the third gate layer GTL3.

The third gate layer GTL3 may be disposed on the third gate insulating layer GI3. The third gate layer GTL3 may include the gate electrode GE2 of the second transistor T2. The gate electrode GE2 of the third transistor T3 may be a part of the first scan write line GPWL.

The second interlayer insulating layer ILD2 may be disposed on the third gate layer GTL3. The second interlayer insulating layer ILD2 may insulate the third gate layer GTL3 from the first source metal layer SDL1.

The first source metal layer SDL1 may be disposed on the second interlayer insulating layer ILD2. The first source metal layer SDL1 may include the ninth and twelfth connection electrodes CE9 and CE12. The ninth connection electrode CE9 may electrically connect the data line DL and the first electrode DE2 of the second transistor T2. The twelfth connection electrode CE12 may electrically connect the second electrode SE2 of the second transistor T2 and the first electrode SE1 of the first transistor T1.

The first via layer VIA1 may be disposed on the first source metal layer SDL1. The first via layer VIA1 may insulate the first source metal layer SDL1 from the second source metal layer SDL2. An upper surface of the first via layer VIA1 may be flat. The first via layer VIA1 may include an organic insulating material such as polyimide (PI).

The second source metal layer SDL2 may be disposed on the first via layer VIA1. The second source metal layer SDL2 may include the data line DL.

The second via layer VIA2 may be disposed on the second source metal layer SDL2. The second via layer VIA2 may insulate the second source metal layer SDL2 from the first electrode of the light emitting element ED. An upper surface of the second via layer VIA2 may be flat. The second via layer VIA2 may include an organic insulating material such as polyimide (PI).

Figure 16:
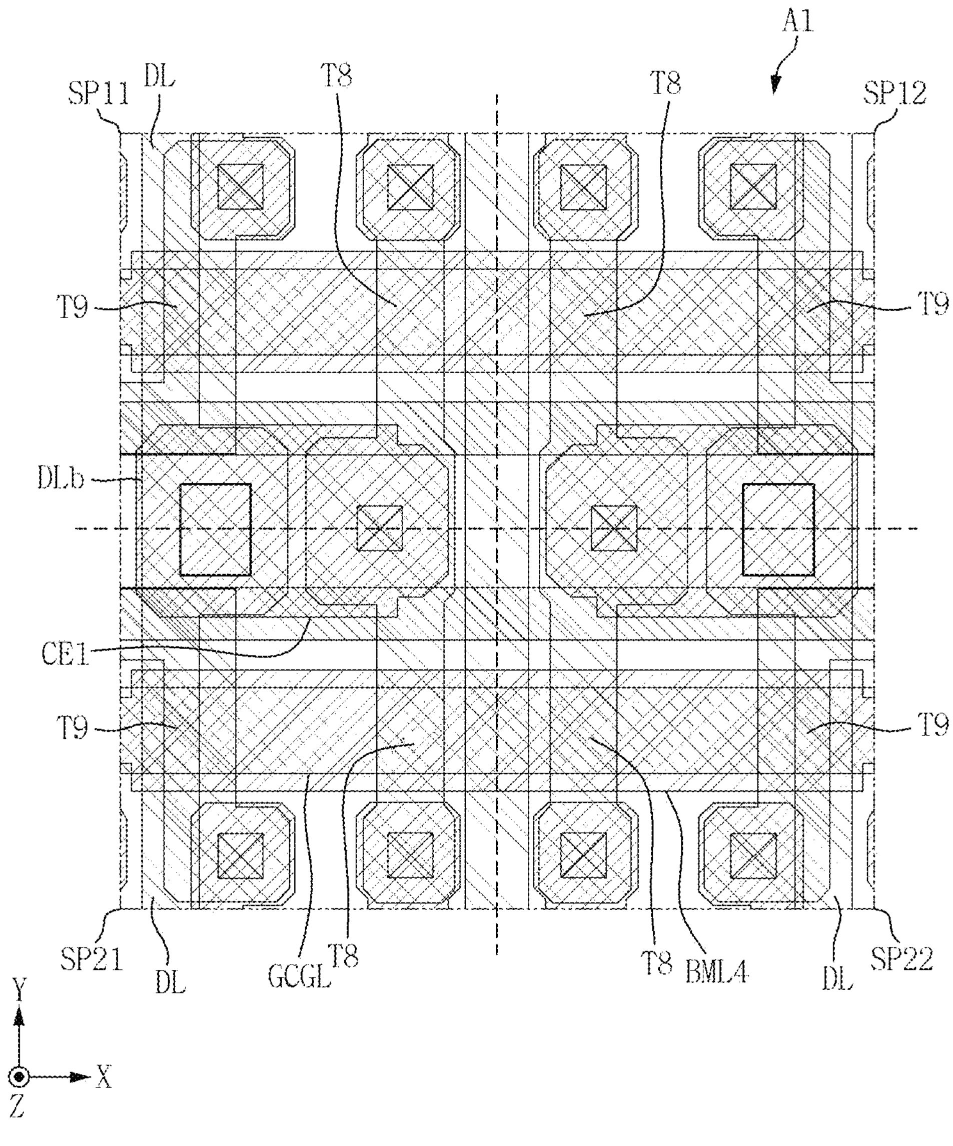
FIG. 16 is a layout view of area A1 of FIG. 10.

FIG. 16 is a layout view of area A1 of FIG. 10.

Figure 17:
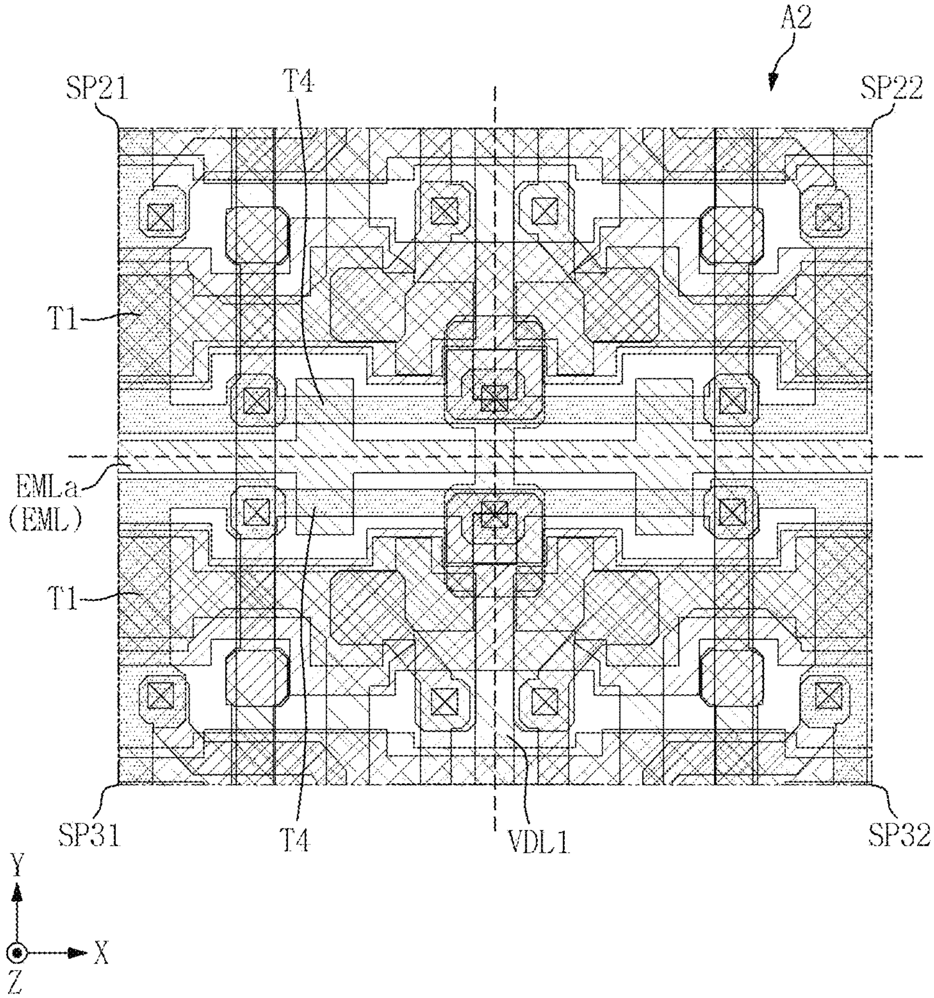
FIG. 17 is a layout view of area A2 of FIG. 10.

Referring to FIG. 16 in conjunction with FIG. 10, pixels SP arranged in the same column may share a single data line DL. The first portions DLa of the data line DL may be electrically connected to the first electrodes of the second transistors T2 of the pixels SP to supply the first data voltage. The second portions DLb of the data line DL may be electrically connected to the eighth transistors T8 of the pixels SP to supply the second data voltage. For example, since the (1-1)$^{th}$ pixel SP11 and the (2-1)$^{th}$ pixel SP21 are designed to be horizontally symmetrical, they may share a single second portion DLb of the data line DL. The second portion DLb of the data line DL may supply the second data voltage to the eighth transistors T8 of the (1-1)$^{th}$ pixel SP11 and the (2-1)$^{th}$ pixel SP21 through a single first connection electrode CE1. Therefore, the display device 10 may increase the integration density of pixel circuits by reducing the number of contact holes, thereby realizing high-resolution image quality. FIG. 17 is a layout view of area A2 of FIG. 10.

Referring to FIG. 17 in conjunction with FIG. 10, first portions EMLa of an emission line EML may be electrically connected to the gate electrodes of the fourth transistors T4 of pixels SP to supply an emission signal. For example, since the (2-1)$^{th}$ pixel SP21 and the (3-1)$^{th}$ pixel SP31 are designed to be horizontally symmetrical, they may share a single first portion EMLa of the emission line EML. The first portion EMLa of the emission line EML may include an extending portion extending in the X-axis direction, a first protruding portion protruding upward from the extending portion and overlapping the (2-1)$^{th}$ pixel SP21, and a second protruding portion protruding downward from the extending portion and overlapping the (3-1)$^{th}$ pixel SP31. The first protruding portion of the first portion EMLa of the emission line EML may include the gate electrode of the fourth transistor T4 of the (2-1)$^{th}$ pixel SP21, and the second protruding portion may include the gate electrode of the fourth transistor T4 of the (3-1)$^{th}$ pixel SP31. The first portion EMLa of the emission line EML may supply an emission signal to the gate electrodes of the fourth transistors T4 of the (2-1)$^{th}$ pixel SP21 disposed on the upper side and the (3-1)$^{th}$ pixel SP31 disposed on the lower side. Therefore, the display device 10 may increase the integration density of pixel circuits by reducing the number of emission lines EML, thereby realizing high-resolution image quality.

The display device according to one embodiment of the present disclosure can be applied to various electronic devices. The electronic device according to the one embodiment of the present disclosure includes the display device described above, and may further include modules or devices having additional functions in addition to the display device.

Figure 18:
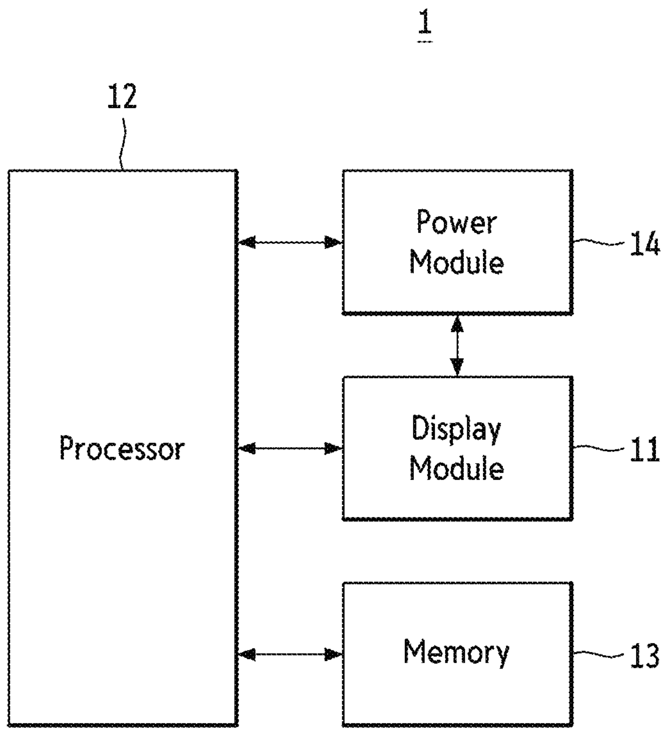
FIG. 18 is a block diagram of an electronic device according to an embodiment.

FIG. 18 is a block diagram of an electronic device according to one embodiment of the present disclosure.

Referring to FIG. 18, the electronic device 1 according to one embodiment of the present disclosure may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), and a controller.

The memory 15 may store data information necessary for the operation of the processor 12 or the display module 11. When the processor 12 executes an application stored in the memory 15, an image data signal and/or an input control signal is transmitted to the display module 11, and the display module 11 can process the received signal and output image information through a display screen.

The power module 14 may include a power supply module such as, for example a power adapter or a battery, and a power conversion module that converts the power supplied by the power supply module to generate power necessary for the operation of the electronic device 1.

At least one of the components of the electronic device 11 according to the one embodiment of the present disclosure may be included in the display device 10 according to the embodiments of the present disclosure. In addition, some modules of the individual modules functionally included in one module may be included in the display device 10, and other modules may be provided separately from the display device 10. For example, the display device 10 may include the display module 11, and the processor 12, the memory 13, and the power module 14 may be provided in the form of other devices within the electronic device 11 other than the display device 10.

Figure 19:
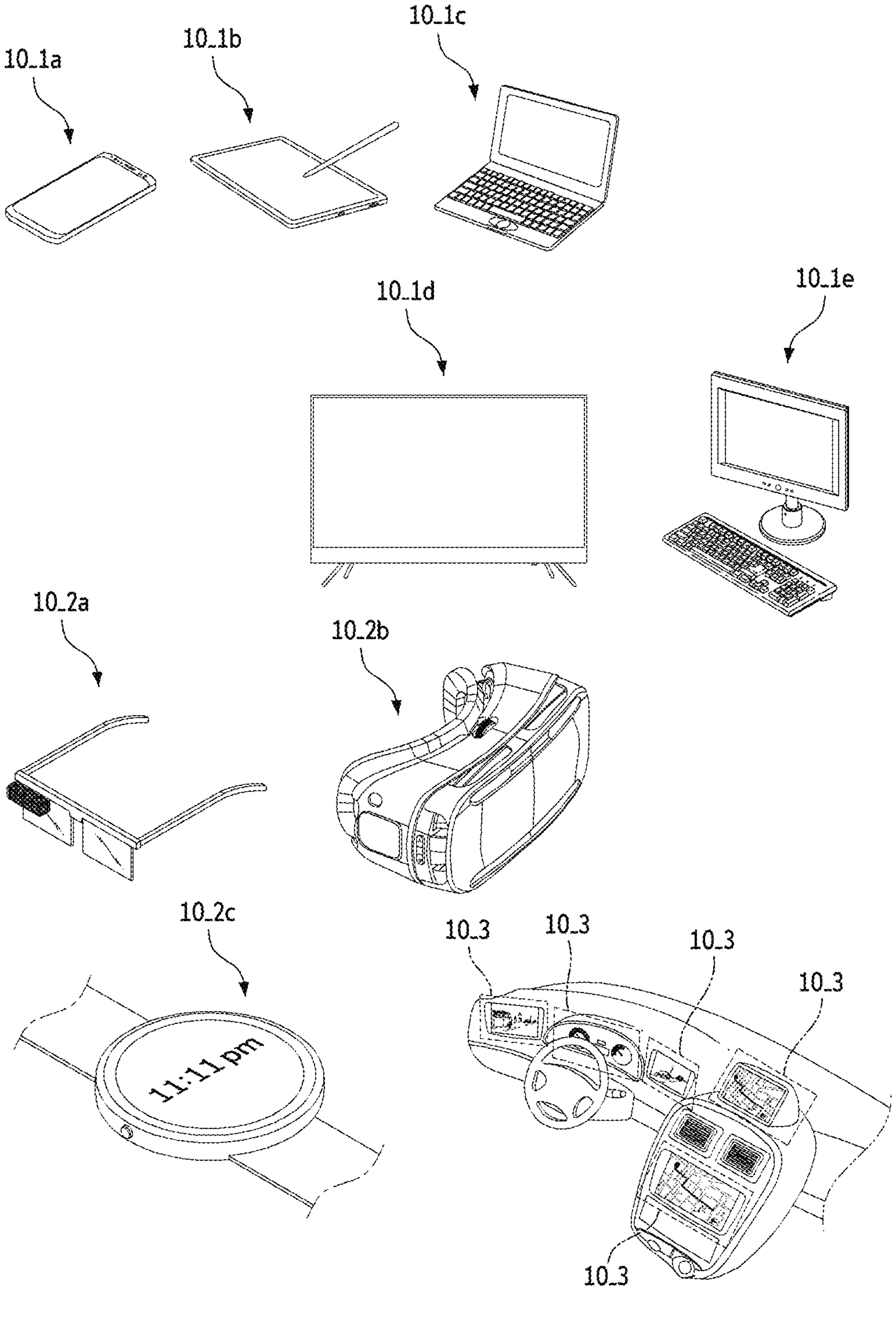
FIG. 19 is a schematic diagram of an electronic device according to various embodiments.

FIG. 19 is a schematic diagram of an electronic device according to various embodiments of the present disclosure.

Referring to FIG. 19, various electronic devices to which display devices 10 according to embodiments of the present disclosure are applied may include not only image display electronic devices such as a smart phone 10_1*a*, a tablet PC (personal computer) 10_1*b*, a laptop 10_1*c*, a TV 10_1*d*, and a desk monitor 10_1*e*, but also wearable electronic devices including display modules such as, for example smart glasses 10_2*a*, a head mounted display 10_2*b*, and a smart watch 10_2*c*, and vehicle electronic devices 10_3 including display modules such as a CID (Center Information Display) and a room mirror display arranged on a dashboard, center fascia, and dashboard of an automobile.

The above description is an example of technical features of the disclosure, and those skilled in the art to which the disclosure pertains will be able to make various modifications and variations. Therefore, the embodiments of the disclosure described above may be implemented separately or in combination with each other.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display device comprising:

a data line extending in a first direction; and a first pixel, a second pixel, and a third pixel sequentially disposed in the first direction and electrically connected to the data line, wherein each of the first, second, and third pixels comprises:

a light emitting element;

a first transistor that controls a control current based on a voltage of a first node;

a second transistor that electrically connects the data line to a second node, which is a first electrode of the first transistor based on a first scan write signal;

a third transistor that electrically connects the first node to a third node, which is a second electrode of the first transistor, based on the first scan write signal;

a fourth transistor that controls a driving current, which is supplied to the light emitting element, based on a voltage of a fourth node receiving the control current;

a fifth transistor that electrically connects the data line to a fifth node, which is a first electrode of the fourth transistor, based on a second scan write signal; and a sixth transistor that electrically connects the fourth node to a sixth node, which is a second electrode of the fourth transistor, based on the second scan write signal, and the data line is electrically connected to the fifth transistor of each of the first and second pixels through a connection electrode.

2. The display device of claim 1, wherein the connection electrode overlaps a boundary area of the first and second pixels.

3. The display device of claim 1, wherein the data line comprises:

a plurality of first portions electrically connected to the second transistors of the first and second pixels, respectively; and a second portion simultaneously connected to the fifth transistors of the first and second pixels.

4. The display device of claim 3, wherein one of the first portions of the data line supplies a first data voltage having a grayscale value of the first pixel in case that the second and third transistors of the first pixel are turned on, another one of the first portions of the data line supplies a first data voltage having a grayscale value of the second pixel in case that the second and third transistors of the second pixel are turned on, and the second portion of the data line supplies a second data voltage, which is a constant voltage, in case that the fifth and sixth transistors of the first and second pixels are turned on.

5. The display device of claim 1, further comprising:

a sweep line supplying a sweep signal having a pulse that linearly decreases from a gate-high voltage to a gate-low voltage; and a first capacitor comprising a first capacitor electrode connected to the first node and a second capacitor electrode connected to the sweep line.

6. The display device of claim 1, wherein the first and fourth transistors comprise a low-temperature polysilicon-based semiconductor layer, and the second, third, fifth and sixth transistors comprise an oxide-based semiconductor layer.

7. The display device of claim 1, further comprising:

an emission line extending in a second direction intersecting the first direction, wherein each of the first, second, and third pixels further comprises:

a seventh transistor that supplies a first high-potential voltage to the second node based on an emission signal of the emission line; and an eighth transistor that electrically connects the third node to the fourth node based on the emission signal.

8. The display device of claim 7, wherein the seventh transistor of the second pixel and the seventh transistor of the third pixel are electrically connected to an emission line.

9. The display device of claim 7, wherein the emission line overlaps a boundary area of the second and third pixels.

10. The display device of claim 7, wherein each of the first, second, and third pixels further comprises:

a ninth transistor that supplies a second high-potential voltage to the fifth node based on the emission signal; and a tenth transistor that electrically connects the sixth node to a seventh node, which is a first electrode of the light emitting element, based on the emission signal.

11. The display device of claim 10, wherein each of the first, second, and third pixels further comprises:

an eleventh transistor that discharges the first node to an initialization voltage based on a first scan initialization signal; and a twelfth transistor that discharges the fourth node to the initialization voltage based on a second scan initialization signal.

12. The display device of claim 11, further comprising:

a first low-potential line that supplies a first low-potential voltage to a second electrode of the light emitting element, wherein each of the first, second, and third pixels further comprises a thirteenth transistor discharging the seventh node to a second low-potential voltage based on the voltage of the fourth node.

13. A display device comprising:

a data line extending in a first direction;

an emission line extending in a second direction intersecting the first direction; and a first pixel, a second pixel, and a third pixel sequentially disposed in the first direction and electrically connected to the data line, wherein each of the first, second, and third pixels comprises:

a light emitting element;

a first transistor that controls a control current based on a voltage of a first node;

a second transistor that is turned on during a first period to electrically connect the data line to a second node, which is a first electrode of the first transistor;

a third transistor that is turned on during the first period to electrically connect the first node to a third node, which is a second electrode of the first transistor;

a fourth transistor that supplies a first high-potential voltage to the second node based on an emission signal of the emission line; and a fifth transistor that electrically connects the third node to a fourth node based on the emission signal, the fourth transistor of the second pixel and the fourth transistor of the third pixel are electrically connected to an emission line.

14. The display device of claim 13, wherein the emission line overlaps a boundary area of the second and third pixels.

15. The display device of claim 13, wherein the emission line comprises:

an extending portion extending in the second direction;

a first protruding portion protruding from the extending portion toward a first side and overlapping the second pixel; and a second protruding portion protruding from the extending portion toward a second side opposite to the first side and overlapping the third pixel.

16. The display device of claim 15, wherein the first protruding portion of the emission line comprises a gate electrode of the fourth transistor of the second pixel, and the second protruding portion comprises a gate electrode of the fourth transistor of the third pixel.

17. The display device of claim 13, wherein each of the first, second, and third pixels further comprises:

a sixth transistor that discharges the first node to an initialization voltage during a second period before the first period;

a seventh transistor that controls a driving current, which is supplied to the light emitting element, based on a voltage of the fourth node receiving the control current;

an eighth transistor that is turned on during a third period after the first period to electrically connect the data line to a fifth node, which is a first electrode of the seventh transistor; and a ninth transistor that is turned on during the third period to electrically connect the fourth node to a sixth node, which is a second electrode of the seventh transistor.

18. The display device of claim 17, wherein the data line supplies a first data voltage having a grayscale value during the first period and supplies a second data voltage, which is a constant voltage, during the third period.

19. The display device of claim 17, further comprising:

a sweep line that supplies a sweep signal, which linearly decreases from a gate-high voltage to a gate-low voltage, during a fourth period after the third period, wherein each of the first, second, and third pixels further comprises a first capacitor comprising:

a first capacitor electrode connected to the first node, and a second capacitor electrode connected to the sweep line.

20. The display device of claim 19, wherein each of the first, second, and third pixels further comprises:

a tenth transistor that supplies a second high-potential voltage to the fifth node during the fourth period; and an eleventh transistor that electrically connects the sixth node to a seventh node, which is a first electrode of the light emitting element, during the fourth period.

21. An electronic device, comprising:

a display module configured to provide an image; and a processor configured to transmit an image data signal to the display module, and wherein the display module comprises:

a data line extending in a first direction; and a first pixel, a second pixel, and a third pixel sequentially disposed in the first direction and electrically connected to the data line, wherein each of the first, second, and third pixels comprises:

a light emitting element;

a first transistor that controls a control current based on a voltage of a first node;

a second transistor that electrically connects the data line to a second node, which is a first electrode of the first transistor based on a first scan write signal;

a third transistor that electrically connects the first node to a third node, which is a second electrode of the first transistor, based on the first scan write signal;

a fourth transistor that controls a driving current, which is supplied to the light emitting element, based on a voltage of a fourth node receiving the control current;

a fifth transistor that electrically connects the data line to a fifth node, which is a first electrode of the fourth transistor, based on a second scan write signal; and a sixth transistor that electrically connects the fourth node to a sixth node, which is a second electrode of the fourth transistor, based on the second scan write signal, and the data line is electrically connected to the fifth transistor of each of the first and second pixels through a connection electrode.

* * * * *